US007359956B2

(12) United States Patent
Kanai et al.

(10) Patent No.: US 7,359,956 B2
(45) Date of Patent: Apr. 15, 2008

(54) DATA TRANSFER SCHEME USING CACHING AND DIFFERENTIAL COMPRESSION TECHNIQUES FOR REDUCING NETWORK LOAD

(75) Inventors: Tatsunori Kanai, Kanagawa (JP); Toshibumi Seki, Kanagawa (JP); Kenichiro Yoshii, Tokyo (JP); Hideaki Sato, Kanagawa (JP); Takayuki Miyazawa, Kanagawa (JP); Haruhiko Toyama, Kanagawa (JP); Yasuhiro Kimura, Kanagawa (JP); Hideki Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1236 days.

(21) Appl. No.: 10/094,462

(22) Filed: Mar. 11, 2002

(65) Prior Publication Data

US 2002/0129168 A1 Sep. 12, 2002

(30) Foreign Application Priority Data

Mar. 12, 2001 (JP) ............................ P2001-069286

(51) Int. Cl.
*G06F 15/16* (2006.01)
*H03M 7/34* (2006.01)

(52) U.S. Cl. ...................... 709/219; 709/227; 709/230; 341/51; 341/87

(58) Field of Classification Search ........ 709/217–219, 709/236, 227–229; 341/87, 51
See application file for complete search history.

(56) References Cited

U.S. PATENT DOCUMENTS

| 4,558,302 | A | * | 12/1985 | Welch | ............... | 341/51 |
| 5,521,597 | A | * | 5/1996 | Dimitri | ............... | 341/51 |
| 5,627,533 | A | * | 5/1997 | Clark | ............... | 341/51 |

(Continued)

FOREIGN PATENT DOCUMENTS

JP      09-251414      9/1997

(Continued)

OTHER PUBLICATIONS

Barron C. Housel, Ph.d, et al., "WebExpress: A System for Optimizing Web Browsing in a Wireless Environment", Proceedings of MOBICOM 96, 1996, pp. 108-116.

(Continued)

*Primary Examiner*—Joseph E. Avellino
(74) *Attorney, Agent, or Firm*—Oblon, Spivak, McClelland, Maier & Neustadt, P.C.

(57) ABSTRACT

In a data transfer scheme using a caching technique and/or a compression technique which is capable of reducing the network load of a network connecting between data transfer devices, correspondences between data and their names are registered at the data transfer devices and the corresponding names are transferred, instead of transferring the data, for those data for which the correspondences are registered, so that it is possible to reduce the amount of transfer data among the data transfer devices. Even when the name corresponding to the data is not registered so that it is impossible to transfer the corresponding name instead of transferring the data, it is possible to reduce the amount of transfer data among the data transfer devices by transferring the compressed data in which this data is expressed in a compressed form by utilizing the name corresponding to the registered reference data.

2 Claims, 40 Drawing Sheets

U.S. PATENT DOCUMENTS

| | | | | |
|---|---|---|---|---|
| 5,654,703 | A * | 8/1997 | Clark, II | 341/51 |
| 5,909,695 | A * | 6/1999 | Wong et al. | 711/133 |
| 5,946,697 | A * | 8/1999 | Shen | 715/513 |
| 6,173,311 | B1 * | 1/2001 | Hassett et al. | 709/202 |
| 6,215,906 | B1 * | 4/2001 | Okada | 382/239 |
| 6,292,115 | B1 * | 9/2001 | Heath | 341/87 |
| 6,385,656 | B1 * | 5/2002 | Appelman | 709/247 |
| 6,427,187 | B2 * | 7/2002 | Malcolm | 709/219 |
| 6,487,189 | B1 * | 11/2002 | Eldridge et al. | 370/338 |
| 6,697,844 | B1 * | 2/2004 | Chan et al. | 709/206 |
| 6,721,740 | B1 * | 4/2004 | Skinner et al. | 707/10 |
| 7,035,902 | B1 * | 4/2006 | Bates et al. | 709/206 |
| 2001/0034839 | A1 * | 10/2001 | Karjoth et al. | 713/190 |
| 2002/0059463 | A1 * | 5/2002 | Goldstein | 709/247 |
| 2002/0078371 | A1 * | 6/2002 | Heilig et al. | 713/200 |
| 2002/0109706 | A1 * | 8/2002 | Lincke et al. | 345/700 |
| 2002/0178341 | A1 * | 11/2002 | Frank | 711/216 |
| 2004/0049598 | A1 * | 3/2004 | Tucker et al. | 709/246 |
| 2004/0073630 | A1 * | 4/2004 | Copeland et al. | 709/218 |

FOREIGN PATENT DOCUMENTS

| | | |
|---|---|---|
| JP | 11-502047 | 2/1999 |
| JP | 2000-222273 | 8/2000 |

OTHER PUBLICATIONS

Mika Liljeberg, et al., "Optimizing World-Wide Web for Weakly Connected Mobile Workstations: An Indirect Approach", Proceedings of SDNE '95, 1995, pp. 1-8.

Armando Fox, et al., "Reducing WWW Latency and Bandwidth Requirements by Real-Time Distillation", Proceedings of 5th WWW Conference, 1996, (12 pages).

U.S. Appl. No. 10/094,462, filed Mar. 11, 2002, Kanai et al.
U.S. Appl. No. 10/396,521, filed Mar. 26, 2003, Koba et al.
U.S. Appl. No. 10/092,540, filed Mar. 8, 2002, Pending.
U.S. Appl. No. 10/094,462, filed Mar. 11, 2002, Pending.
U.S. Appl. No. 10/167,413, filed Jun. 13, 2002, Pending.
U.S. Appl. No. 10/253,517, filed Sep. 25, 2002, Pending.

* cited by examiner

FIG.7

FINGERPRINT : 5B83···B6

```
<ADDRESS>
    <COUNTRY>
        JAPAN
    </COUNTRY>
    <CITY>
        TOKYO
    </CITY>
    <NAME>
        TARO
    </NAME>
</ADDRESS>
```

FIG.8

```
<ADDRESS>
    <COUNTRY>
        JAPAN
    </COUNTRY>
    <CITY>
        OSAKA
    </CITY>
    <NAME>
        TARO
    </NAME>
</ADDRESS>
```

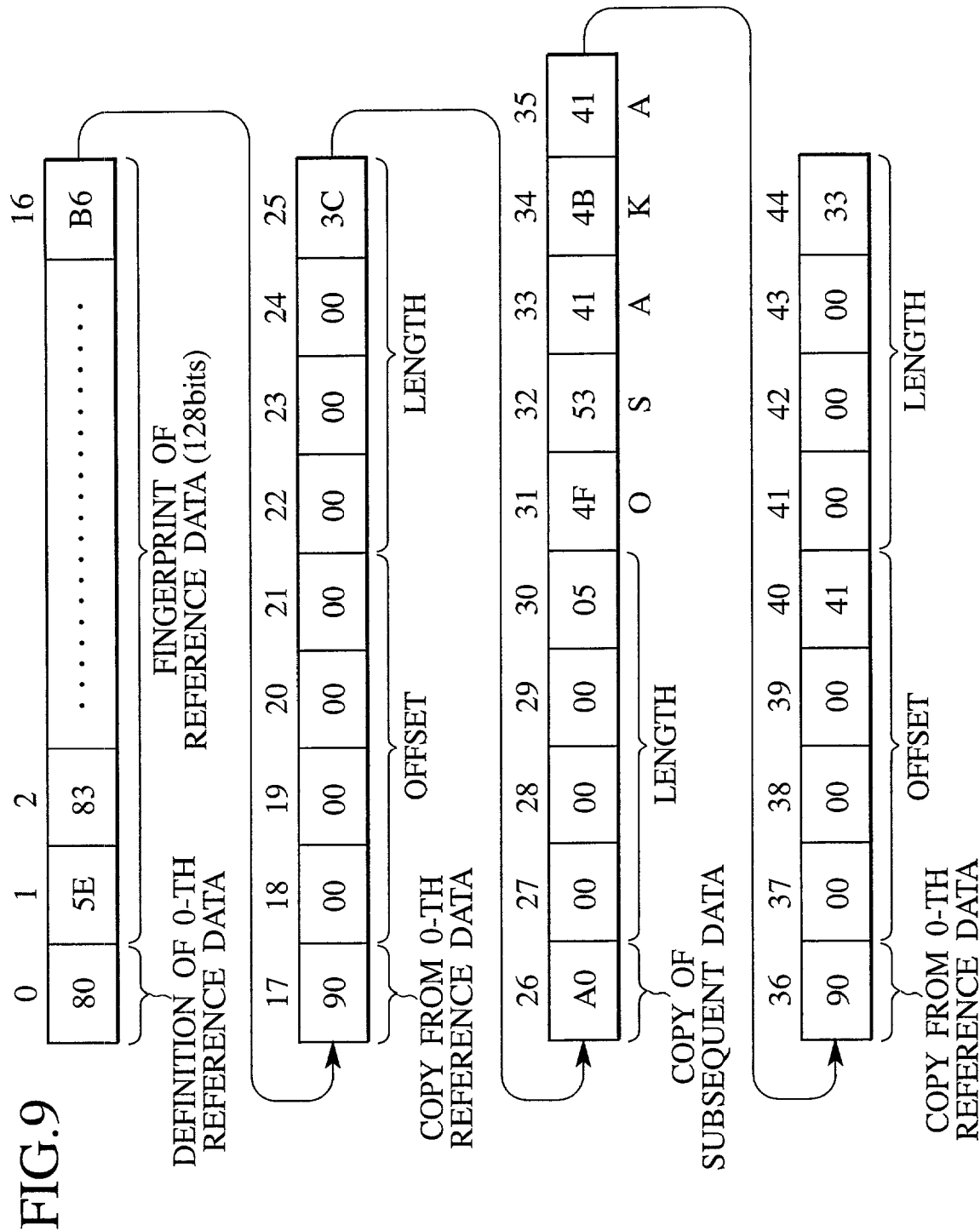

FIG.10

FINGERPRINT : 82F3···38

```
<DATALIST>↵
    <CITY>TOKYO</CITY>↵
    </CITY>OSAKA</CITY>↵
    </CITY>KYOTO</CITY>↵
    </CITY>NAGOYA</CITY>↵
    </CITY>SAPPORO</CITY>↵
    </CITY>FUKUOKA</CITY>↵
</DATALIST>↵
```

FIG.11

FINGERPRINT : A20D···CB

```
<DATALIST>↵
    <ITEM>CHERRY</ITEM>↵
    <ITEM>APPLE</ITEM>↵
    <ITEM>ORANGE</ITEM>↵
    <ITEM>GRAPE</ITEM>↵
    <ITEM>BANANA</ITEM>↵
    <ITEM>PEACH</ITEM>↵
</DATALIST>↵
```

FIG.12

```
<DATALIST>↵
    <CITY>TOKYO</CITY>↵
    </CITY>OSAKA</CITY>↵
    <ITEM>BANANA</ITEM>↵
    <ITEM>PEACH</ITEM>↵
</DATALIST>↵
```

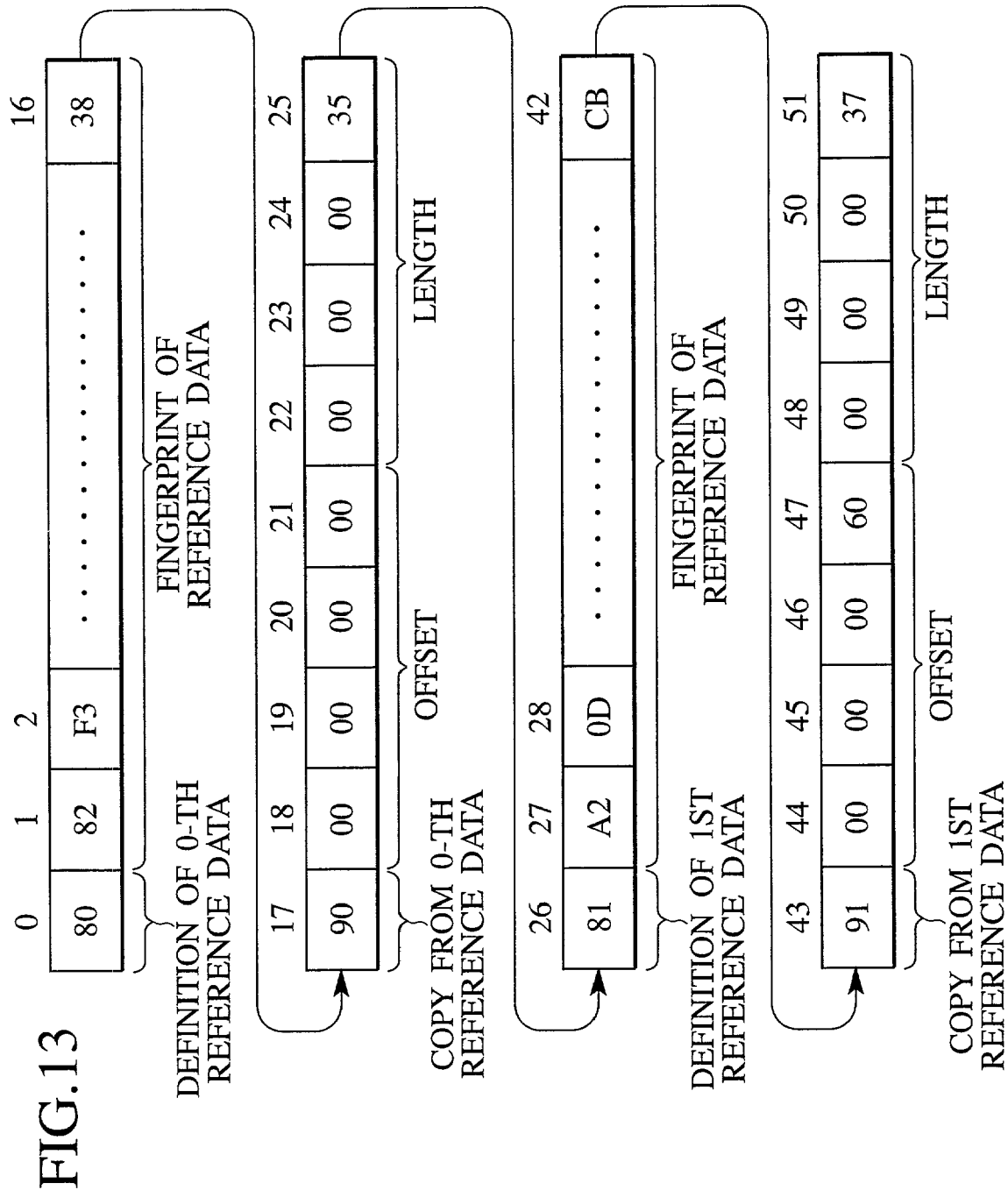

OFF TARGET FLAG / HEADER | DATA

OFF TARGET FLAG / HEADER

HEADER | DATA

HEADER

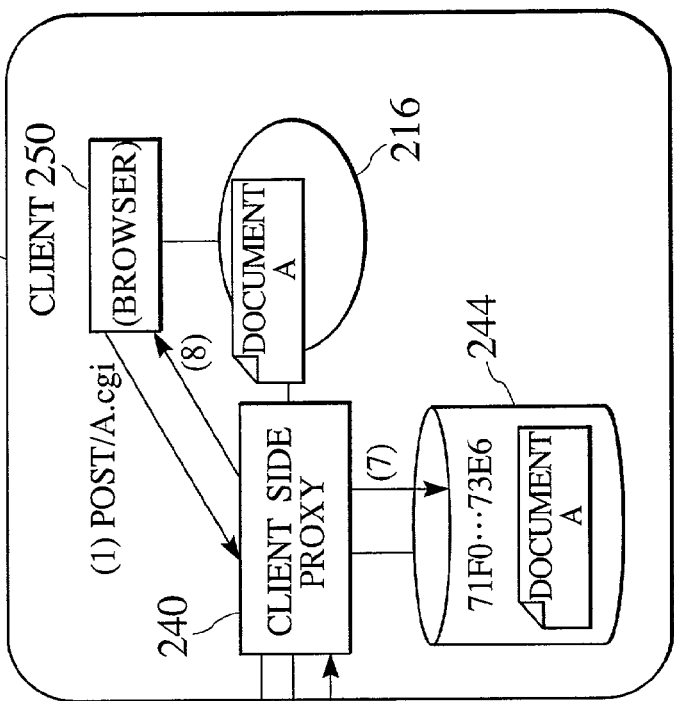
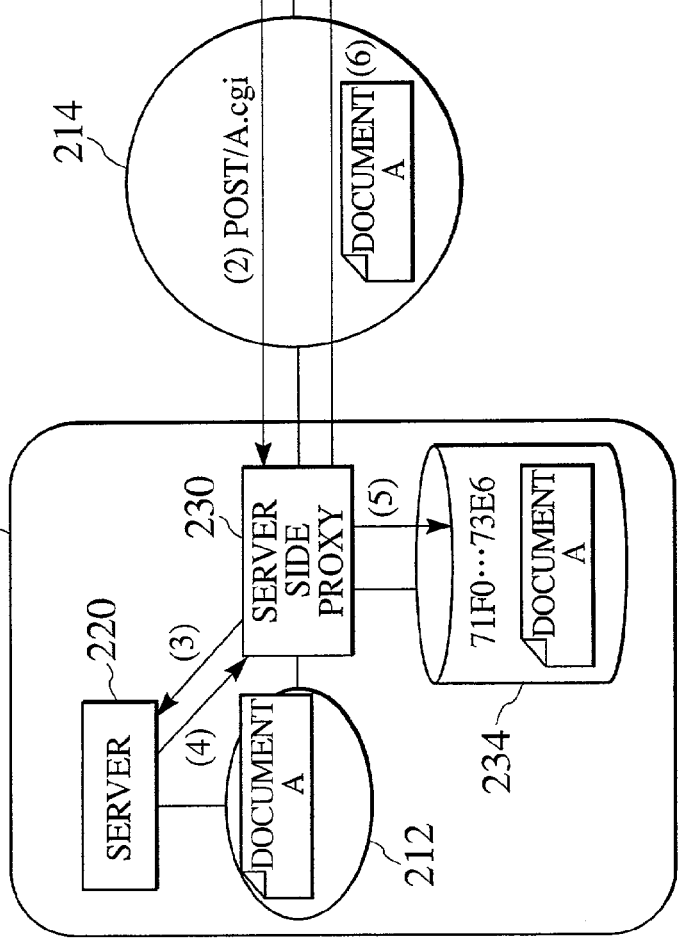
FIG.29

FIG.39

```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint-Mode: 01 ─── IDENTIFICATION INFORMATION
Content-Length: 548
```
HEADER

```
<!DOCTYPE HTML PUBLIC "-//W3C//DTD HTML 4.01 Transitional//EN"
 "http://www.w3.org/TR/html4/loose.dtd">
<HTML>
<HEAD><TITLE>My Homepage</TITLE></HEAD>
<BODY>
<H1>Welcome!</H1>
     ...
</BODY>
</HTML>
```
BODY (DATA)

FIG.42

```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint-Mode: 00 ——————— IDENTIFICATION INFORMATION
Content-Length: 548
```
} HEADER

```
<!DOCTYPE HTML PUBLIC "-//W3C//DTD HTML 4.01 Transitional//EN"
 "http://www.w3.org/TR/html4/loose.dtd">
<HTML>
<HEAD><TITLE>My Homepage</TITLE></HEAD>
<BODY>
<H1>Welcome!</H1>
    ...
</BODY>
</HTML>
```
} BODY (DATA)

FIG.43

```
HTTP/1.1 200 OK
Date: Tue, 26 Nov 1996 15:42:51 GMT
Content-Type: text/html
Last-Modified: Wed, 30 Oct 1996 13:15:30 GMT
Fingerprint-Mode: 01 ——— IDENTIFICATION INFORMATION
Fingerprint: 6E39B97293A0DE54E2048B0C84E30128 ——— FP
Content-Length: 548
```
} HEADER

```
<!DOCTYPE HTML PUBLIC "-//W3C//DTD HTML 4.01 Transitional//EN"
 "http://www.w3.org/TR/html4/loose.dtd">
<HTML>
<HEAD><TITLE>My Homepage</TITLE></HEAD>
<BODY>
<H1>Welcome!</H1>
   ...
</BODY>
</HTML>
```
} BODY (DATA)

FIG.46

```
HTTP/1.1 200 OK
Date: Tue, 26 Nov 1996 15:42:51 GMT
Content-Type: text/html
Last-Modified: Wed, 30 Oct 1996 13:15:30 GMT
No-Compression:                    ——— NON-COMPRESSION FLAG
Content-Length: 548
```
} HEADER

```
<!DOCTYPE HTML PUBLIC "-//W3C//DTD HTML 4.01 Transitional//EN"
 "http://www.w3.org/TR/html4/loose.dtd">
<HTML>
<HEAD><TITLE>My Homepage</TITLE></HEAD>
<BODY>
<H1>Welcome!</H1>
    ...
</BODY>
</HTML>
```
} BODY (DATA)

FIG. 49

```
         ⎧ HTTP/1.1 200 OK
         ⎪ Date: Tue, 26 Nov 1996 15:42:51 GMT
         ⎪ Content-Type: text/html
HEADER  ⎨  Last-Modified: Wed, 30 Oct 1996 13:15:30 GMT
         ⎪ No-FP-Compression: ─── OFF TARGET FLAG
         ⎩ Content-Length: 548

⎧ <!DOCTYPE HTML PUBLIC "-//W3C//DTD HTML 4.01 Transitional//EN"
         ⎪     "http://www.w3.org/TR/html14/loose.dtd">
         ⎪ <HTML>
         ⎪ <HEAD><TITLE>My Homepage</TITLE></HEAD>
BODY    ⎨  <BODY>
(DATA)   ⎪ <H1>Welcome!</H1>
         ⎪    ...
         ⎪ </BODY>
         ⎩ </HTML>
```

FIG. 50

```
         ⎧ HTTP/1.1 200 OK
         ⎪ Date: Tue, 26 Nov 1996 15:42:51 GMT
         ⎪ Content-Type: text/html
HEADER  ⎨  Last-Modified: Wed, 30 Oct 1996 13:15:30 GMT
         ⎪ No-FP-Compression: ─── OFF TARGET FLAG
         ⎩ Content-Length: 0
```

FIG.51

HEADER
```
HTTP/1.1 200 OK
Date: Tue, 26 Nov 1996 15:42:51 GMT
Content-Type: text/html
Last-Modified: Wed, 30 Oct 1996 13:15:30 GMT
Content-Length: 548
```

BODY (DATA)
```
<!DOCTYPE HTML PUBLIC "-/W3C//DTD HTML 4.01 Transitional//EN"
 "http://www.w3.org/TR/html4/loose.dtd">
<HTML>
<HEAD><TITLE>My Homepage</TITLE></HEAD>
<BODY>
<H1>Welcome!</H1>
  ...
</BODY>
</HTML>
```

FIG.52

HEADER
```
HTTP/1.1 200 OK
Date: Tue, 26 Nov 1996 15:42:51 GMT
Content-Type: text/html
Last-Modified: Wed, 30 Oct 1996 13:15:30 GMT
Content-Length: 0
```

DATA TRANSFER SCHEME USING CACHING AND DIFFERENTIAL COMPRESSION TECHNIQUES FOR REDUCING NETWORK LOAD

BACKGROUND OF THE INVENTION

1. Field of the Invention

The present invention relates to a data transfer scheme for carrying out data transfer at a data transfer device on behalf of another device.

2. Description of the Related Art

The client-server type information system formed by servers for providing various services through a network and clients for requesting desired services to the servers has been widely used. In particular, the World Wide Web system (which is also simply called Web) formed by Web servers and clients that communicate with each other by using the HTTP protocol on the Internet is the very widely used client-server type information system. Usually, a server program is operating on a server and a prescribed tool (program) such as a browser is operating on a client. The contents of the services provided on the Internet are also wide ranging so that there are various existing services including services for providing, delivering or transferring information such as that of text, still image, video and audio (home pages, e-mails, and digital contents, for example) or programs, electronic shop services for selling goods, reservation services for seats, rooms, etc., agency services for various contracts, etc., and services in new styles are appearing steadily.

Now, in the client-server type information system such as the Web, the service is provided basically by carrying out data transfer between the client and the server, regardless of the style of the service to be provided. Consequently, a capacity (bandwidth) of the network to be used for communications between the client and the server tends to be a bottleneck of the entire system. For this reason, usually, the caching technique has been used in order to reduce the network load.

In the case of the Web system, the browser or the like that is operating on the client often uses a cache mechanism for caching recently accessed data. In the Web, accesses are made by specifying information or services by using names called URLs, so that among data that are returned in response to information or services requested to the Web servers in the past, those data that are cachable are recorded in the cache on the client in correspondence with their URLs. In this case, when an information or service with the same URL as that recorded in the cache is requested, if it is possible to judge that the response data recorded in the cache has not become obsolete, it is possible to eliminate a communication between the client and the Web server by returning that response data recorded in the cache.

When a plurality of users are existing on a LAN inside offices of an enterprise, a LAN of a research organization or a LAN inside a home, it is also popular to provide a proxy server between that LAN and the Internet and provide the cache mechanism in the proxy server. The cache inside the client (the cache of the browser, for example) will be operated as a dedicated cache of that client or user, but the cache of the proxy server on the LAN will be operated as a cache shared by users of the plurality of clients or users. For this reason, the cache of the proxy server works even in the case of making an access to the URL accessed by the other (another client) in the past.

Now, in the Web, communications between the client and the server are carried out by the protocol called HTTP. The HTTP protocol uses a set of a "request message" to be sent from the client to the server and a "reply message" to be returned from the server to the client in response to that request.

The request message is formed by a "request header" and a "request body". The request header contains various information necessary for the access such as a URL for specifying an information or service to be accessed and a method name indicating the type of access. The request body contains data to be sent to the server. Such data contained in the request body are also referred to as "request data".

The reply message is formed by a "reply header" and a "reply body". The reply header contains information such as a processing result status, and the reply body contains the requested information or data of the processing result of the requested service. Such data contained in the reply body are also referred to as "reply data".

The major methods for the request message that are used for accesses of information or services include a "GET method" that reads out an information on the server, a "PUT method" that writes data of the user into the server, and a "POST method" that receives a processing result in response to the request. Besides them, methods such as a "DELETE method" are also defined.

In many cases, the request body of the request message in the GET method and the reply body of the reply message in the PUT method are empty. The request body of the request message in the POST message contains information to be used for the processing on the server side according to the need, and the reply body of the reply message in the POST method contains data obtained as a result of that processing.

The data to be read out from the server by the GET method can be classified into "dynamic data" that are to be generated at the server side at a time of each reading and "static data" that are to be returned as they are already stored at the server side. Among them, the dynamic data can possibly have different contents at different occasions of reading even for the same URL, so that in many cases, the server returns the reply message with the reply header that contains an indication that it is not cachable. Consequently, what are to be the caching targets among the Web data are the static data.

These static data can be classified into "shared data" that can be accessed by unspecified many users and "private data" for which the access control for allowing accesses only to the specific user is to be carried out by utilizing the user authentication. The former shared data are cachable for any caches. However, the latter private data are not cachable for a shared cache such as that of the proxy server (because there is a need for the server to return the private data after carrying out the user authentication). The private data are cachable in the case of a personal dedicated cache such as that of the browser.

In the POST method, the result of processing at the server side is to be returned so that the server returns the result by the reply message with the reply header that contains an indication that it is not cachable in general. For this reason, the reply data of the POST method are usually not the caching target.

In the PUT method, data are to be sent to the server so that there is no processing that involves the cache.

In the conventional Web cache, the caching targets are the static contents. Many information or services disclosed on the Web were used to be those disclosed to unspecified many users for which the information updating does not occur very frequently, so that the rate of the static contents were very high and therefore even the conventional caching technique was effective in reducing the network load.

However, in conjunction with the spread of a system in which the user makes accesses to the information or services on the server via the network by using the Web browser such as that of Web based ASP (Application Service Provider), the amount of data that cannot be handled by the conventional caching technique is increasing. For example:

there are many private data for which the accessible users are limited by carrying out the user authentication;

there are many dynamic data to be generated by referring to the back-end database;

there are many cases of using the POST method such as those of the accounting slip processing and the searching; and there are many cases of using the PUT method for the purpose of sharing information within a group.

As a consequence, the use of the caching technique alone has been becoming rather ineffective as a method for reducing the network load.

BRIEF SUMMARY OF THE INVENTION

It is therefore an object of the present invention to provide a data transfer scheme using a caching technique and/or a compression technique which is capable of reducing the network load of a network connecting between data transfer devices.

According to one aspect of the present invention there is provided a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer device comprising: a reception unit configured to receive the first data from the first communication device; a cache unit configured to register cache data that were transmitted to the another data transfer device in past, in correspondence to cache data names each of which is generated according to a content of each cache data and assigned to each cache data; a processing unit configured to carry out a processing for transmitting a first data name that is generated according to a content of the first data and assigned to the first data, instead of transmitting the first data, when the first data name is registered in the cache unit, or a processing for registering the first data in correspondence to the first data name into the cache unit when the first data name is not registered in the cache unit, while carrying out a processing for transmitting a compressed data in which the first data is expressed by setting at least one cache data registered in the cache unit as reference data and utilizing a cache data name corresponding to the reference data when the first data can be expressed in a compressed form, or a processing for transmitting the first data when the first data cannot be expressed in the compressed form, upon receiving the first data transmitted from the first communication device; and a transmission unit configured to transmit the first data name, the compressed data, or the first data to the another data transfer device according to a processing carried out by the processing unit.

According to another aspect of the present invention there is provided a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer device comprising: a reception unit configured to receive the first data, or a first data name that is generated according to a content of the first data and assigned to the first data, or a compressed data in which the first data is expressed by setting at least one other data as reference data and utilizing a reference data name that is generated according to a content of the reference data and assigned to the reference data, from the another data transfer device; a cache unit configured to register cache data that were received from the another data transfer device in past, in correspondence to cache data names each of which is generated according to a content of each cache data and assigned to each cache data; a processing unit configured to carry out a processing for acquiring a cache data registered in correspondence to the first data name from the cache unit and transmitting an acquired cache data when the first data name is received from the another data transfer device, or a processing for registering the first data in correspondence to the first data name to be assigned to the first data into the cache unit and transmitting received first data when the first data is received from the another data transfer device, or a processing for acquiring the cache data registered in the cache unit in correspondence to the reference data name of the reference data contained in the compressed data, decompressing the first data from the compressed data by using acquired cache data as the reference data, registering decompressed first data in correspondence to the first data name to be assigned to the first data into the cache unit, and transmitting the decompressed first data, when the compressed data is received from the another data transfer device; and a transmission unit configured to transmit the acquired cache data, the received first data, or the decompressed first data to the second communication device according to a processing carried out by the processing unit.

According to another aspect of the present invention there is provided a data transfer method at a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the data transfer method comprising: receiving the first data from the first communication device; judging whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and carrying out a processing for transmitting a first data name that is generated according to a content of the first data and assigned to the first data, instead of transmitting the first data, when the first data name is registered in the cache unit, or a processing for registering the first data in correspondence to the first data name into the cache unit when the first data name is not registered in the cache unit, while carrying out a processing for transmitting a compressed data in which the first data is expressed by setting at least one cache data registered in the cache unit as reference data and utilizing a cache data name corresponding to the reference data when the first data can be expressed in a compressed form, or a processing for transmitting the first data when the first data cannot be expressed in the compressed form.

According to another aspect of the present invention there is provided a data transfer method at a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the data transfer method comprising: receiving the first data, or a first data name that is generated according to a content of the first data and assigned to the first data, or a compressed data in which the first data is expressed by setting at least one other data as reference data and utilizing a reference data name that is generated according to a content of the reference data and assigned to the reference data, from the another data transfer device; and carrying out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting received first data when the first data is received from the another data transfer device, or a processing for acquiring the cache data registered in the cache unit in correspondence to the reference data name of the reference data contained in the compressed data, decompressing the first data from the compressed data by using acquired cache data as the reference data, registering decompressed first data in correspondence to the first data name to be assigned to the first data into the cache unit, and transmitting the decompressed first data.

According to another aspect of the present invention there is provided a computer program product for causing a computer to function as a data transfer device for receiving first data transmitted from a first communication device, transmitting the first data to another data transfer device connected to a second communication device that is a destination of the first data, receiving second data transmitted from the second communication device from the another data transfer device, and transmitting the second data to the first communication device that is a destination of the second data, the computer program product comprising: a first computer program code for causing the computer to receive the first data from the first communication device; a second computer program code for causing the computer to judge whether a first data name that is generated according to a content of the first data and assigned to the first data is registered in a cache unit configured to register cache data that were transmitted to the another data transfer device in past in correspondence to cache data names each of which is generated according to a content of each cache data and assigned to each cache data; and a third computer program code for causing the computer to carry out a processing for transmitting a first data name that is generated according to a content of the first data and assigned to the first data, instead of transmitting the first data, when the first data name is registered in the cache unit, or a processing for registering the first data in correspondence to the first data name into the cache unit when the first data name is not registered in the cache unit, while carrying out a processing for transmitting a compressed data in which the first data is expressed by setting at least one cache data registered in the cache unit as reference data and utilizing a cache data name corresponding to the reference data when the first data can be expressed in a compressed form, or a processing for transmitting the first data when the first data cannot be expressed in the compressed form.

According to another aspect of the present invention there is provided a computer program product for causing a computer to function as a data transfer device for receiving first data transmitted from a first communication device through another data transfer device, transmitting the first data to a second communication device that is a destination of the first data, receiving second data transmitted from the second communication device, and transmitting the second data to the another data transfer device connected to the first communication device that is a destination of the second data, the computer program product comprising: a first computer program code for causing the computer to receive the first data, or a first data name that is generated according to a content of the first data and assigned to the first data, or a compressed data in which the first data is expressed by setting at least one other data as reference data and utilizing a reference data name that is generated according to a content of the reference data and assigned to the reference data, from the another data transfer device; and a second computer program code for causing the computer to carry out a processing for acquiring a cache data registered in correspondence to the first data name from a cache unit configured to register cache data that were received from the another data transfer device in past in correspondence to cache data names each of which is generated according to a content of each cache data and assigned to each cache data, and transmitting an acquired cache data when the first data name is received from the another data transfer device, or a processing for registering the first data in correspondence to the first data name to be assigned to the first data into the cache unit and transmitting received first data when the first data is received from the another data transfer device, or a processing for acquiring the cache data registered in the cache unit in correspondence to the reference data name of the reference data contained in the compressed data, decompressing the first data from the compressed data by using acquired cache data as the reference data, registering decompressed first data in correspondence to the first data name to be assigned to the first data into the cache unit, and transmitting the decompressed first data.

Other features and advantages of the present invention will become apparent from the following description taken in conjunction with the accompanying drawings.

BRIEF DESCRIPTION OF THE DRAWINGS

FIG. 7 is a diagram for explaining one exemplary concrete example of a differential compression by the method explained by FIGS. 6A, 6B and 6C in one embodiment of the present invention.

FIG. 8 is a diagram for explaining one exemplary concrete example of a differential compression by the method explained by FIGS. 6A, 6B and 6C in one embodiment of the present invention.

FIG. 9 is a diagram for explaining another method for commanding a differential compression that can be used in one embodiment of the present invention.

FIG. 10 is a diagram for explaining another exemplary concrete example of a differential compression by the method explained by FIG. 9 in one embodiment of the present invention.

FIG. 11 is a diagram for explaining one exemplary concrete example of a differential compression by the method explained by FIG. 9 in one embodiment of the present invention.

FIG. 12 is a diagram for explaining one exemplary concrete example of a differential compression by the method explained by FIG. 9 in one embodiment of the present invention.

FIG. 13 is a diagram for explaining another method for commanding a differential compression that can be used in one embodiment of the present invention.

FIG. 29 is a diagram for explaining one exemplary data transfer between the server side proxy of FIG. 19 and the client side proxy of FIG. 20 according to one embodiment of the present invention.

FIG. 39 a diagram showing a concrete example of a message in a message format shown in FIG. 14A.

FIG. 42 a diagram showing a concrete example of a message in a message format shown in FIG. 14D.

FIG. 43 a diagram showing a concrete example of a message in a message format shown in FIG. 15A.

FIG. 46 a diagram showing a concrete example of a message in a message format shown in FIG. 17A.

FIG. 49 a diagram showing a concrete example of a message in a message format shown in FIG. 18A.

FIG. 50 a diagram showing a concrete example of a message in a message format shown in FIG. 18B.

FIG. 51 a diagram showing a concrete example of a message in a message format shown in FIG. 18C.

FIG. 52 a diagram showing a concrete example of a message in a message format shown in FIG. 18D.

DETAILED DESCRIPTION OF THE INVENTION

Figure 1:
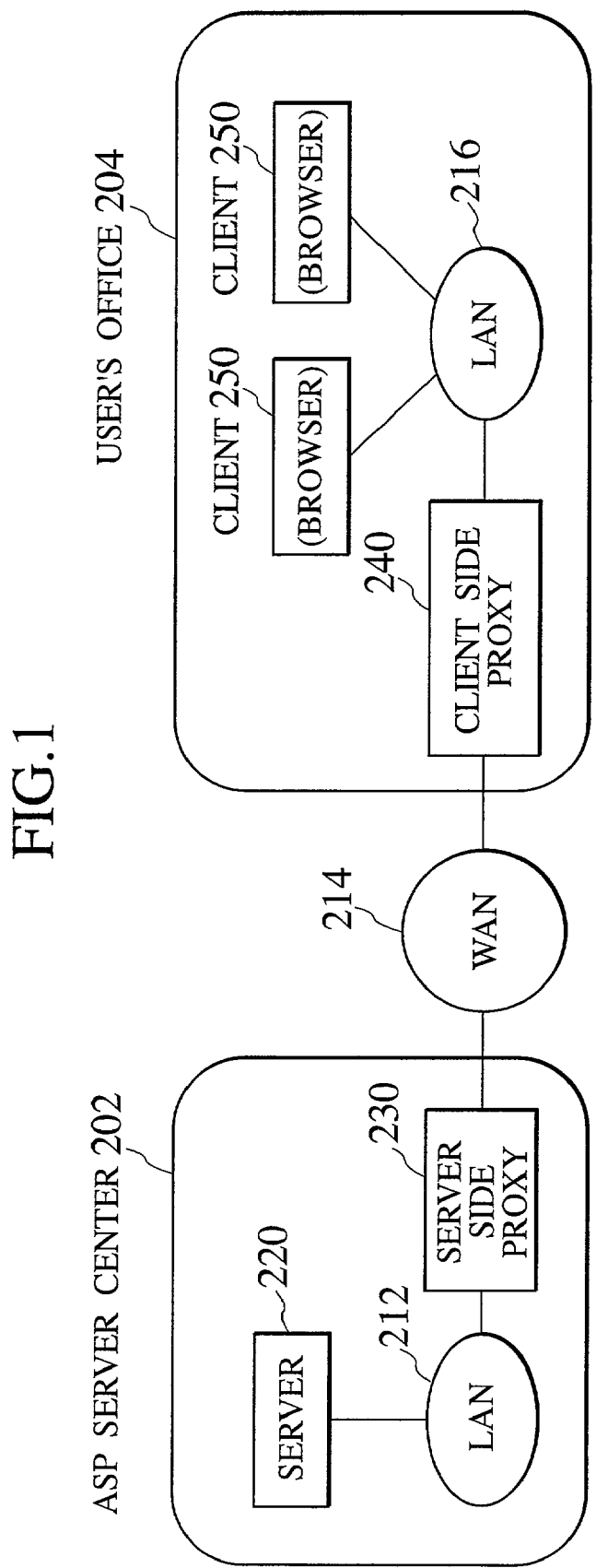
FIG. 1 is a diagram showing one exemplary configuration of a computer network system according to one embodiment of the present invention.

Referring now to FIG. 1 to FIG. 52, one embodiment of the data transfer scheme according to the present invention will be described in detail.

In the following, an exemplary case in which a WAN is the Internet, clients are connected to a user's office LAN, and the HTTP protocol is used will be described, but the present invention is also applicable to the cases where the WAN is other than the Internet, the cases where the clients are located at LAN other than the user's office LAN such as a LAN inside a home, and the cases where the protocol other than the HTTP protocol is to be used.

Figure 38:
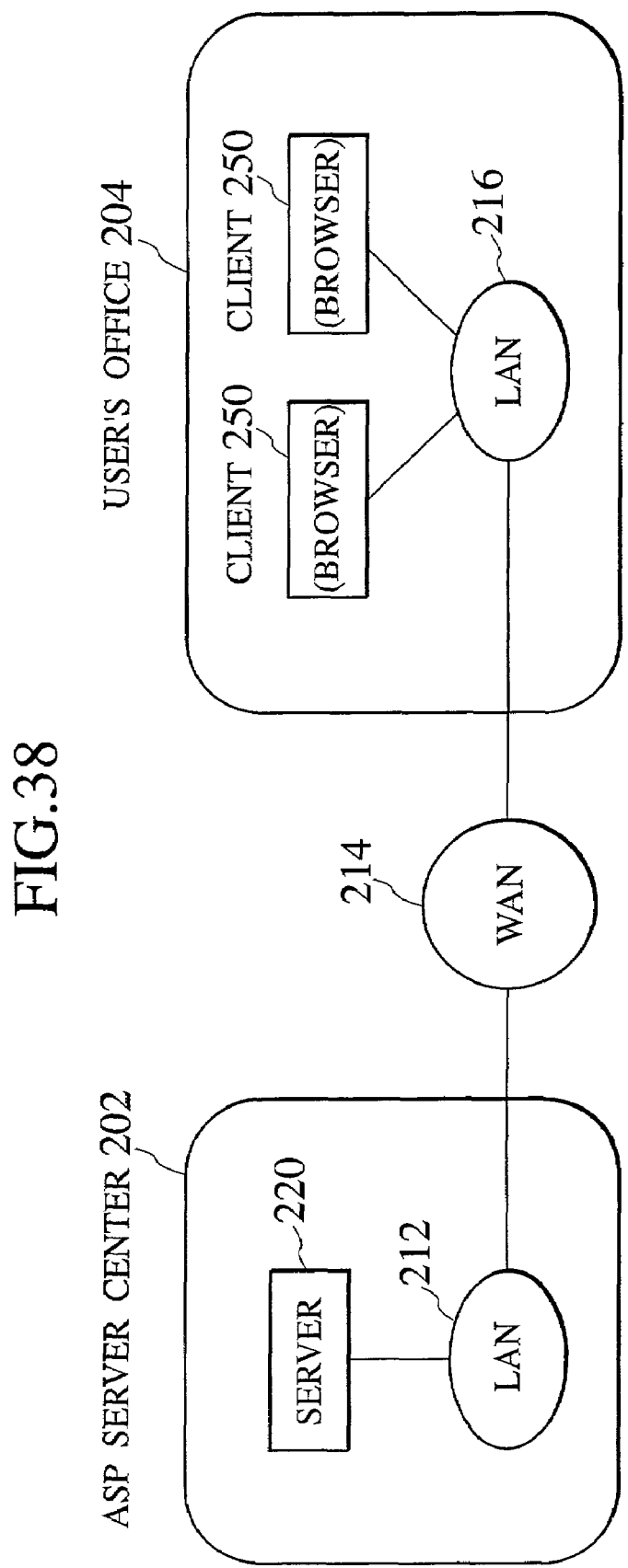
FIG. 38 is a diagram showing an exemplary configuration of a conventional computer network system to which the present invention is to be applied.

FIG. 38 shows an exemplary basic configuration of a computer network system to which the present invention is applied. In this exemplary configuration, a local area network (LAN) 212 inside an ASP server center 202 and a local area network (LAN) 216 inside a user's office 204 are connected through a wide area network (WAN) 214 such as the Internet or dedicated line, such that a server 220 inside the ASP server center 202 and a client 250 inside the user's office 204 are capable of carrying out communications through the LAN 212, the WAN 214 and the LAN 216. One or a plurality of servers 220 are connected to the LAN 212 inside the ASP server center 202 and one or a plurality of clients 250 are connected to the LAN 216 inside the user's office 204.

The Web based ASP provides services using various application programs from the server 220 provided at the ASP server center 202 through the WAN 214, and a user can access these services by using a Web browser or the like on the client 250 provided at the user's office 204.

In such a configuration, the effective communication capacity (bandwidth) of the network connecting between the LAN 216 inside the user's office 204 and the LAN 212 inside the ASP server center 202, especially that of the WAN 214 such as the Internet, is lower than those of the LAN 212 inside the ASP server center 212 and the LAN 216 inside the user's office 204, so that it can become a bottleneck of the performance that can cause the communication delay and give rise to the problem of the lower response performance of the applications.

For this reason, in this embodiment, as shown in FIG. 1, two modules called a server side proxy 230 and a client side proxy 240 are provided at two ends of the WAN 214 that are connecting between the LAN 212 inside the ASP server center 202 and the LAN 216 inside the user's office 204 and a fingerprint compression (FP compression) to be described below or a differential compression to be described below is carried out between them, such that the amount of communication data is reduced and the bottleneck of the wide area network is resolved.

Each one of the server 220, the server side proxy 230, the client proxy 240 and the client 250 can be realized in a form of operating a software (a server program, a server side proxy program, a client side proxy program, or a client program, respectively) on a computer. In this case, the computer will be provided with or connected with softwares such as OS, driver software, packet communication software and encryption software which have desired functions, and hardwares such as communication interface device, external memory device and input/output device. Also, in this case, it is preferable to use the graphical user interface (GUI) for the purpose of entering information from the user or a manager and presenting information to the user.

On the client 250 used by the user in order to utilize the service, a Web browser program or the like is operated according to the purpose. The user utilizes the service by sending a request message to a server that provides the desired service such as the information transfer or the order taking through the Internet from the Web browser and receiving a reply message, or repeating this procedure according to the need, for example. Of course, it is also possible to use a software other than the general purpose software like the Web browser, such as a dedicated software for the purpose of utilizing specific service. Also, the client can be a portable telephone terminal or the like that has the Internet function, for example, rather than the general purpose computer.

On the server 220, a prescribed server program is operated, to provide the service specific to that server site with respect to the user of the client 250.

Figure 2:
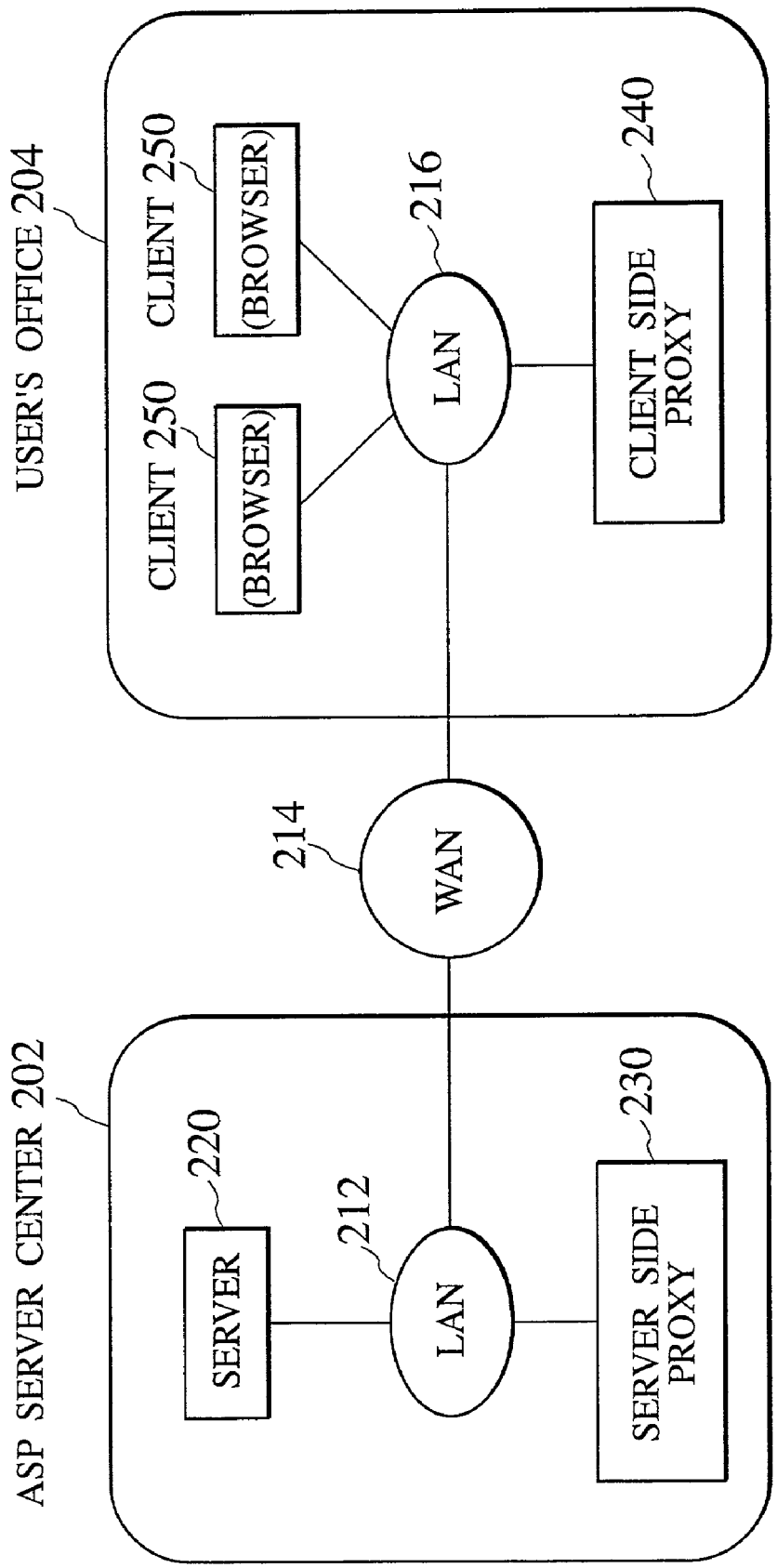
FIG. 2 is a diagram showing another exemplary configuration of a computer network system according to one embodiment of the present invention.

The server side proxy 230 can be provided to operate as a transparent proxy by being connected with both the LAN 212 inside the ASP server center 212 and the WAN 214 as shown in FIG. 1. The server side proxy 230 can also be provided on the LAN 212 inside the ASP server center 212 as shown in FIG. 2. The server side proxy 230 can also be realized as a built-in function of the server 220 as shown in FIG. 3.

Similarly, the client side proxy 240 can be provided to operate as a transparent proxy by being connected with both the LAN 216 inside the user's office 204 and the WAN 214 as shown in FIG. 1. The client side proxy 240 can also be provided on the LAN 216 inside the user's office 16 as shown in FIG. 2. The client side proxy 240 can also be realized as a built-in function of the browser or the like that operates on the client 250 as shown in FIG. 3. The client side proxy 240 can also be realized as a personal client side proxy that is operated on the client 250 on which the browser or the like is operated.

Figure 3:
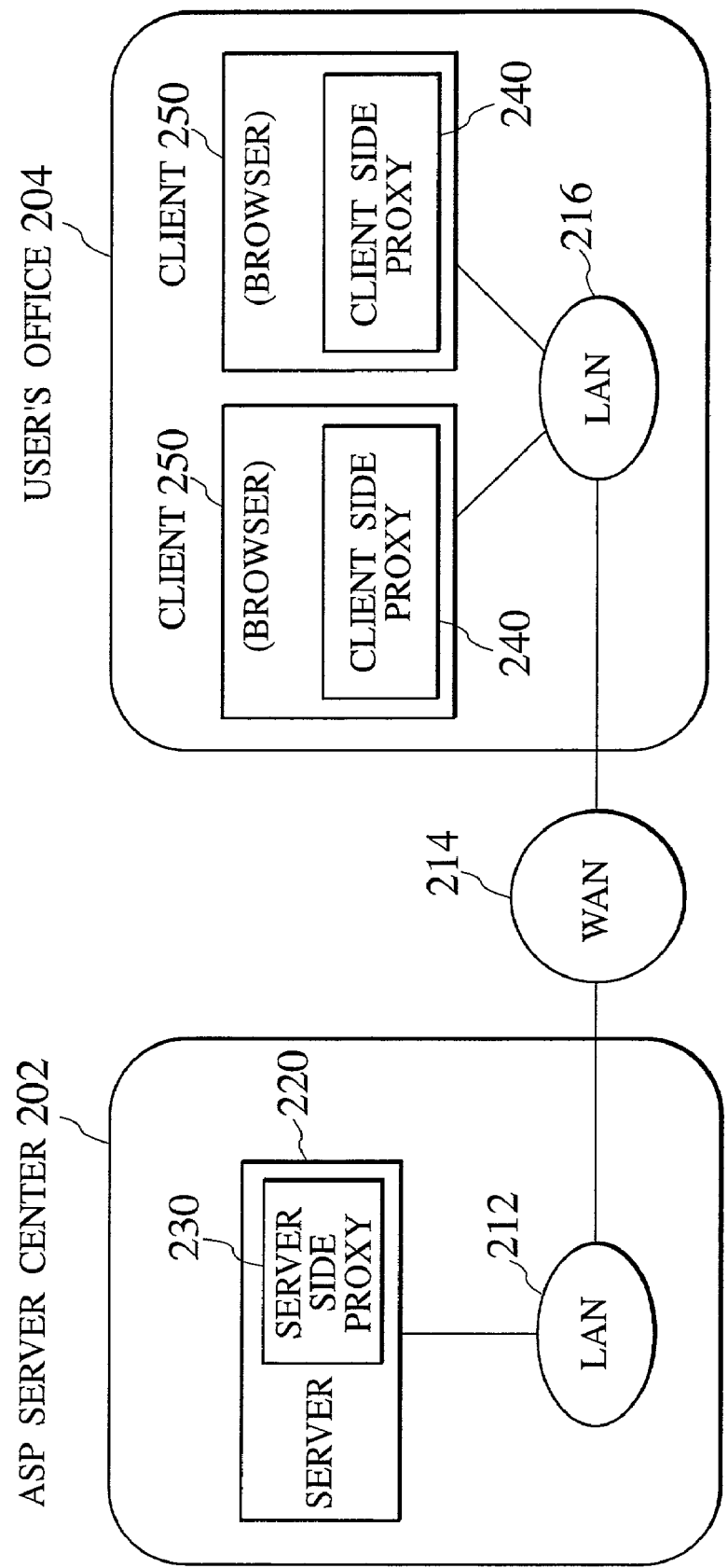
FIG. 3 is a diagram showing another exemplary configuration of a computer network system according to one embodiment of the present invention.

Note that the server side proxy 230 and the client side proxy 240 can be provided in the same form as shown in FIGS. 1 to 3, or in different forms.

In the following, the fingerprint cache and the FP compression using the fingerprint will be described first, and then the differential compression will be described next.

Each one of the server side proxy 230 and the client side proxy 240 of this embodiment has a caching mechanism called fingerprint cache (FP cache). The fingerprint cache records and manages data to be exchanged by the HTTP protocol, by using a name called fingerprint (FP).

Figure 4:
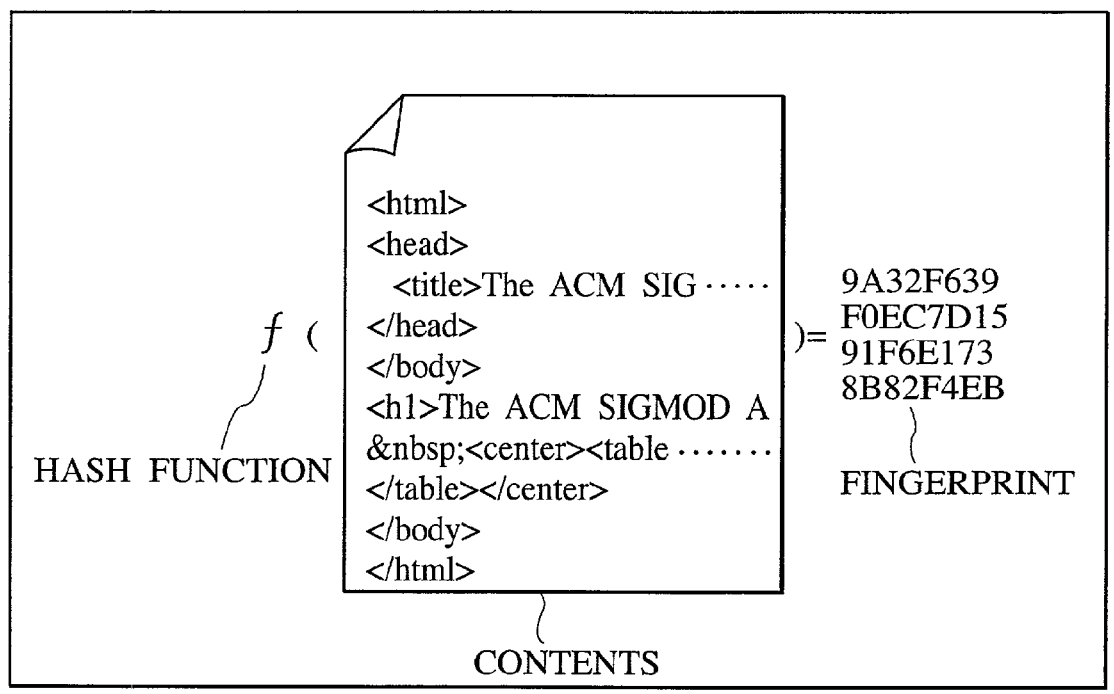
FIG. 4 is a diagram for explaining a fingerprint to be used in one embodiment of the present invention.

As shown in FIG. 4, the fingerprint is a short numerical value that is determined by using a prescribed calculation method (a hash function in the example of FIG. 4) from the content of the data (contents in the example of FIG. 4) to be exchanged by the HTTP protocol. This numerical value may have a variable length, but the numerical value with a fixed length is easier to handle from a viewpoint of the ease of the processing.

As a method for calculating the fingerprint, it is possible to use the well known hash function such as MD-5, SHA-1, etc. These hash functions are already in use for the electronic signature with respect to data, and they can convert arbitrary data given to them into a numerical value of 128 bits in the case of MD-5 or a numerical value of 160 bits in the case of SHA-1. The characteristic of these hash function is that, when two data X1 and X2 are given and the data X1 and the data X2 are identical, the hash value calculated with respect to the data X1 and the hash value calculated with respect to the data X2 will be the same, but when two different data A and B are given, the hash value calculated with respect to the data A and the hash value calculated with respect to the data B will be different at a very high probability (there is a possibility for the hash values calculated with respect to two different data A and B to be the same in principle, but that possibility is negligibly small in practice).

Figure 5:
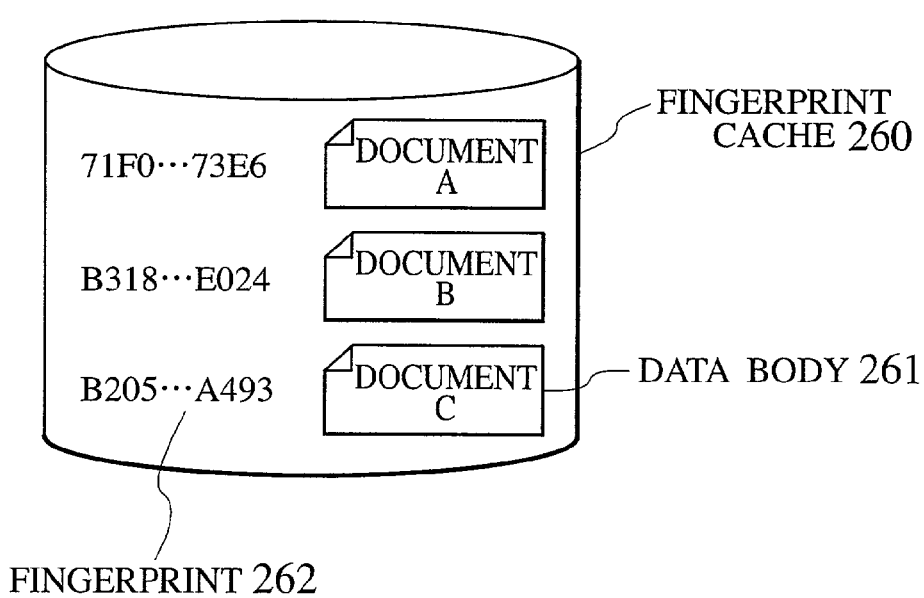
FIG. 5 is a diagram for explaining a fingerprint cache to be used in one embodiment of the present invention.

As shown in FIG. 5, the fingerprint cache 260 to be provided in the server side proxy 230 and the client side proxy 240 is recording and managing the data body 261 that were exchanged by using the HTTP protocol in the past, by using the fingerprint value 262 calculated from that data body 261 as its name.

For example, when the data (such as reply data) are to be transferred from the server side proxy 230 to the client side proxy 240 by using the HTTP protocol, the server side proxy 230 calculates the fingerprint of that data, and if the data corresponding to that fingerprint exists in the fingerprint cache, it implies that (data with the same content as) this data had been transferred in the past, so that the server side proxy 230 transfers the corresponding fingerprint value without transferring that data itself. The client side proxy 240 that received the fingerprint can reproduce the data to be transferred by taking out the data corresponding to that fingerprint value from the fingerprint cache. In this scheme (i.e., the sequence of data compression→data transfer→data decompression), it is possible to reduce the amount of data to be transferred through the network considerably because it suffices to send the fingerprint values for those data that are the same as the data already sent in the past. Of course, the same is also true in the case of transferring the data from the client side proxy 240 to the server side proxy 230.

For the convenience of the explanation, the compression of the amount of transfer data by replacing the data body of a message with the fingerprint by utilizing the fingerprint cache at a time of the data transfer between the server side proxy 230 and the client side proxy 240 will be referred to as a fingerprint compression (FP compression) hereafter.

Note that every message can be a target for applying the FP compression (i.e., a target for which the processing to replace the data with the fingerprint is to be carried out) between the server side proxy 230 and the client side proxy 240, but it is also possible to set those messages that satisfy a prescribed condition as not targets for applying the FP compression (which are always to be transferred without the FP compression), in order to omit the application of the FP compression with respect to those messages for which the fingerprint cache effect cannot be expected, for example.

In this case, the prescribed condition can be that a prescribed information is described in the message header, for example. More specifically, the prescribed condition can be that an information indicating the GET method and an information indicating the request are described in the message header, for example. As another example, the prescribed condition can be that data to be transferred is null or in a very compact size. Of course there are many other variations for the prescribed condition, and it is also possible to use a plurality of conditions in combination.

Next, the differential compression will be described in detail.

In the above described FP compression, the identity of the data is judged at high speed by using the fingerprint of the data, and data identical to the data registered in the fingerprint cache is not transferred between the proxies (the fingerprint of that data is transferred instead) so as to reduce the network load.

However, the FP compression cannot be applied to data that is different from the data registered in the fingerprint cache, even if a majority of the contents of these data are the same. For this reason, in this embodiment, even in the case where the FP compression is not applicable, the amount of the transfer data is reduced as much as possible by expressing the transfer data with a reduced amount of information, where the transfer data is expressed by information for recovering data to be transferred such as a fingerprint of a reference data or a difference information with respect to a reference data, by using one or a plurality of data registered in the fingerprint cache as the reference data. Namely, the basic idea is to utilize the data in the fingerprint cache as the dictionary and not to send data that can be extracted from these data.

For example, the application such as the Web-based ASP often uses only partially different data in which a majority of the contents are the same. For instance, there are many only partially different form data which have the same information entered in many fields. Also, for instance, there are Web pages in which only date or time is different or Web pages in which only a counter value for the total number of accesses is different. The differential compression is particularly effective in such cases.

Such a differential compression utilizing the fingerprint also has an advantage in that there is no need to have a predetermined relationship between data to be transferred and the reference data. Namely, in the case of the conventional differential transfer method, there is a need to have a predetermined base for taking a difference on both sides so that if the differential transfer is to be used for the Web system in practice, there is a need for both sides to register rules such as this data should be used as a base for taking a difference in the case of the URL data, and it has been impossible for such a differential transfer to be effective with respect to arbitrary data. In contrast, the differential compression method of the present invention takes a difference by using the data in the fingerprint cache as the reference data so that it is possible to realize the data compression effect based on a difference without requiring a predetermined base for taking a difference.

For the convenience of the explanation, the compression of the amount of transfer data by replacing the data body of a message with the fingerprint of the reference data or the like by utilizing the fingerprint cache at a time of the data transfer between the server side proxy 230 and the client side proxy 240 will be referred to as a differential compression hereafter.

Note that the exemplary case of setting every message that is a target for applying the FP compression as a target for applying the differential compression will be described here. Of course, similarly as described above, it is also possible to set those messages that satisfy a prescribed condition as not targets for applying the differential compression among the messages that are targets for applying the FP compression (in which case the condition for applying the differential compression is given by adding some extra condition to the condition for applying the FP compression).

For example, an upper limit U2 of data sizes for not applying the differential compression can be set greater than an upper limit U1 of the data sizes for not applying the FP compression (or a lower limit L2 of data sizes for applying the differential compression can be set greater than a lower limit L1 of data sizes for applying the FP compression). It is also possible to judge whether it is a target for applying the FP compression or not according to the data size but whether it is a target for applying the differential compression is determined in such a way that data other than HTML or XML data among the FP compression target data are excluded from the differential compression target data (the differential compression is applied only with respect to the HTML or XML data). Of course there are many other variations in this regard.

In this embodiment, the compression target message will eventually be transferred between the server side proxy 230 and the client side proxy 240 in a form of a message with the FP compressed data, a message with the difference compressed data, or a message with non-compressed data.

Here, the method of the differential compression will be described.

There are various methods that are available as the method of the differential compression utilizing the fingerprint cache, including the following examples.

One of the data registered in the fingerprint cache is set as the reference data, and a value of the fingerprint corresponding to the reference data and information indicating a difference between the transfer data and the reference data are transferred between proxies.

In the above described method, the data registered in the fingerprint cache are also utilized for a part or a whole of the difference from the reference data. Else, a part or a whole of the transfer data is expressed by combining (a part or a whole of) the data registered in the fingerprint cache. For example, any number of the data registered in the fingerprint cache are set as the reference data, and values of the fingerprints corresponding to these reference data, information indicating portions of these reference data to be used for recovering the transfer data, and information indicating a method for recovering the transfer data from these portions are transferred between the proxies.

In the following, an exemplary method for expressing the difference compressed data will be described.

Figure 6A:
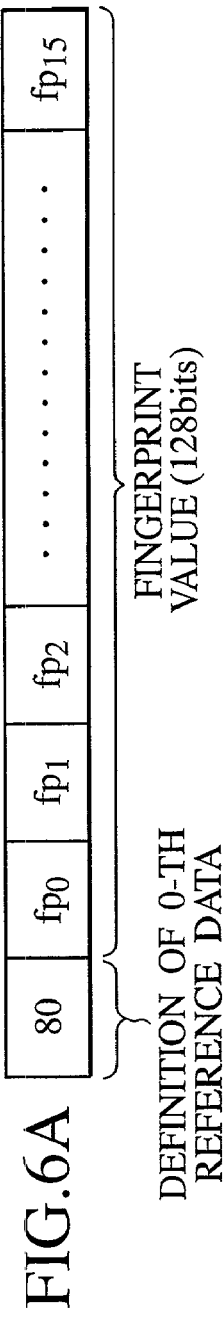
FIGS. 6A, 6B and 6C are diagrams for explaining one method for commanding a differential compression that can be used in one embodiment of the present invention.
Figure 6B:
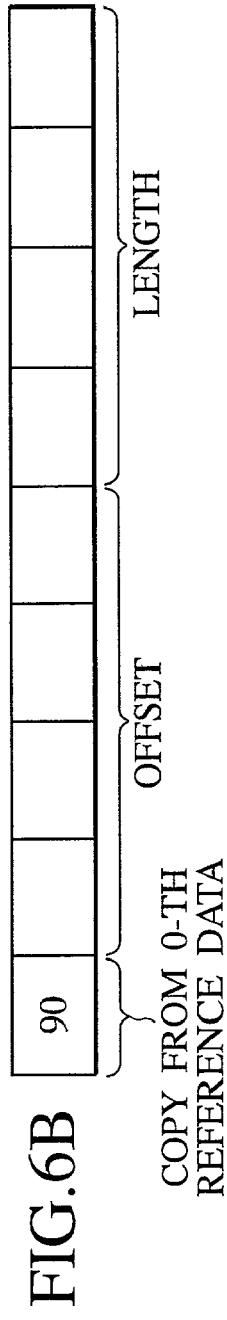
Figure 6C:
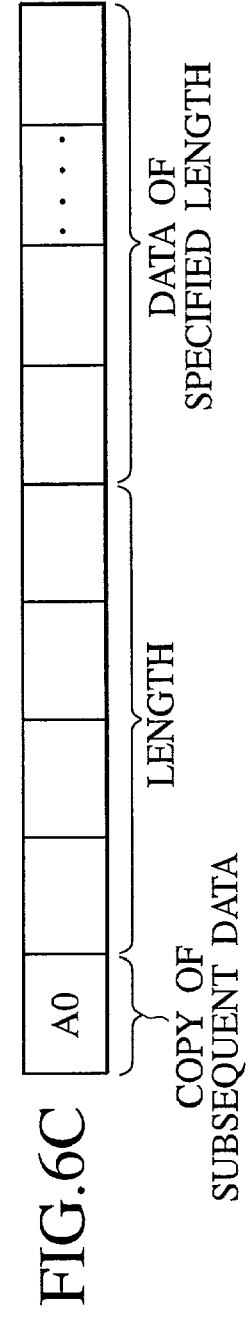

FIGS. 6A, 6B and 6C show three types of commands for expressing data to be transferred. The difference compressed data to be transferred instead of the data is formed by an array of these commands.

FIG. 6A shows a command for defining data to be referred in the fingerprint cache by assigning numbers to the reference data. The first byte "8n" (n=0 in the example of FIG. 6A) is a command identifier. In this command identifier, "n" indicates that the data specified by that fingerprint is to be handled as the n-th reference data. Next 16 bytes starting from the second byte indicate the value of the fingerprint corresponding to that reference data. In this example, "80" to "8F" can be used for handling the reference data starting from the 0-th reference data up to at most the 15-th reference data respectively. Of course, the maximum number of the reference data that can be handled can be increased or decreased depending on the implementation.

FIG. 6B shows a command for copying a partial data from the reference data defined by the command of FIG. 6A. The first byte "9n" (n=0 in the example of FIG. 6B) is a command identifier. In this command identifier, "n" indicates that the n-th reference data defined by the command of FIG. 6A is to be used. Next four bytes starting from the second byte indicates an offset position in that n-th reference data, and next four bytes starting from the sixth byte indicates a data length. By these bytes, this command indicates that data of the specified data length should be copied from the specified offset position in the n-th reference data according to the position (order) of this command in the array (as a constituent portion of the transfer data).

FIG. 6C shows a command for directly specifying data. The first byte "A0" is a command identifier. Next four bytes from the second byte indicates a length of the data. The sixth and subsequent bytes, the data with the number of bytes corresponding to the specified length. By these bytes, this command indicates that data of the sixth and subsequent bytes should be copied according to the position (order) of this command in the array (as a constituent portion of the transfer data).

The difference compressed formed by the array of such commands can be decompressed by copying and concatenating the data in the specified order by referring to the fingerprint cache.

Next, one example of the differential compression according to the above described method will be described.

Suppose that data shown in FIG. 7 is registered in the fingerprint cache with the fingerprint of "5E83 . . . B6".

Then, when data shown in FIG. 8 is given, the differential compression by the command array shown in FIG. 9 can be realized by using the data of FIG. 7 as the reference data.

Namely, upon comparison with the data of FIG. 7, it can be seen that the data of FIG. 8 differs from the data of FIG. 7 only in that "TOKYO" in the data of FIG. 7 is changed to "OSAKA" in the data of FIG. 8. Consequently, as shown in FIG. 9, the 0-th byte indicates that the data of the fingerprint "5E83 . . . B6" is defined as the 0-th reference data, the 17-th byte indicates that 60 bytes from the 0-th byte of the 0-th reference data should be copied, the 26-th byte indicates five letters of "OSAKA" should be copied, and finally the 36-th byte indicates that 51 bytes from the 65-th byte of the 0-th reference data should be copied.

By the decompression according to these commands, the data of FIG. 8 can be reproduced.

In this example, only one reference data is used but it is also possible to use a plurality of reference data.

Next, another example of the differential compression according to the above described method will be described.

Suppose that data shown in FIG. 10 is registered in the fingerprint cache with the fingerprint of "82F3 . . . 38" and data shown in FIG. 11 is registered in the fingerprint cache with the fingerprint of "A20D . . . CB".

Then, when data shown in FIG. 12 is given, the differential compression by the command array shown in FIG. 13 can be realized by using the data of FIG. 10 and the data of FIG. 11 as the reference data.

In the command array of FIG. 13, the 0-th byte indicates that the data of the fingerprint "82F3 . . . 38" is defined as the 0-th reference data, the 17-th byte indicates that 53 bytes from the 0-th byte of the 0-th reference data should be copied, the 26-th byte indicates that the data of the fingerprint "A20D . . . CB" is defined as the first reference data, and the 43rd byte indicates that 55 bytes from the 96-th byte of the first reference data should be copied.

BY the decompression according to these commands, the data of FIG. 12 can be reproduced.

Note that the above described method is a method (method 1) for specifying portions of the reference data that should be used and directly specifying data that should be used, but it is also possible to use a method (method 2) for specifying portions of the reference data that should not be used (portions to be replaced by the directly specified data) and directly specifying data to be inserted into these portions that should not be used. It is also possible to use the method 1 and the method 2 in combination.

Next, with references to FIG. 14A to FIG. 18D, the message format to be used between proxies (for a message that is a target for applying the FP compression and the differential compression) at a time of the data transfer between the server side proxy 230 and the client side proxy 240 will be described.

In the case of the data transfer between the server side proxy 230 and the client side proxy 240, the messages that are targets for applying the FP compression include those messages (FP compressed messages) in which data is FP compressed and replaced with the fingerprint, those messages (Difference compressed messages) in which data that is not FP compressed but difference compressed is loaded, and those messages (non-compressed messages) in which data that is neither FP compressed nor difference compressed is loaded. In the case of a configuration in which not every message is set as a target for applying the FP compression, there are also messages that are not targets for applying the FP compression in addition to these three types of messages.

At the transmitting side proxy among the two proxies, the data is deleted and the fingerprint is added in the case of the FP compressed message, and the data is deleted and the information for recovering that data such as the fingerprint of the reference data is added in the case of the difference compressed message. The data is not deleted in the cases of the non-compressed message and the non-compression target message.

At the receiving side proxy among the two proxies, there is a need to be capable of identifying the above described three or four types of messages. The fingerprint is turned into the data in the case of receiving the FP compressed message, and the data is recovered in the case of receiving difference compressed message. Also, the registration into the fingerprint cache is carried out in the case of receiving the difference compressed message or the non-compressed message.

Figure 14A:
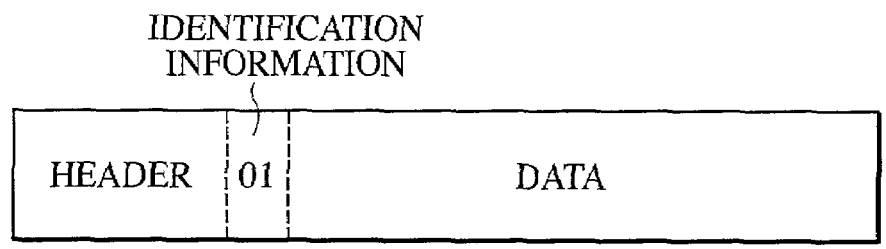
FIGS. 14A, 14B, 14C and 14D are diagrams showing exemplary message formats that can be used in one embodiment of the present invention.
Figure 14B:
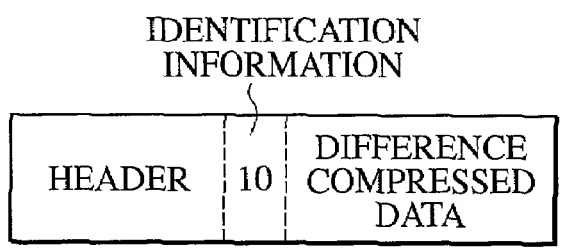
Figure 14C:
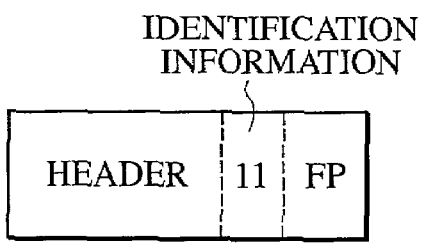
Figure 14D:
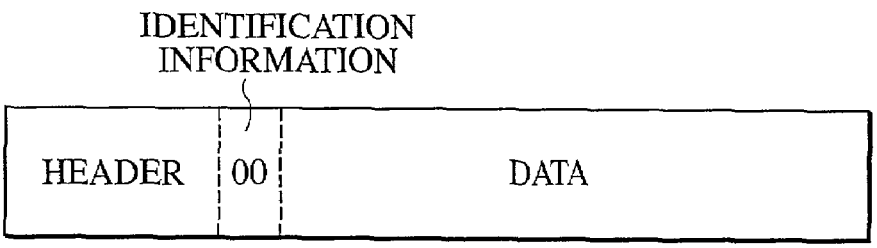

FIGS. 14A, 14B, 14C and 14D show exemplary message formats, where FIG. 14A shows the non-compressed message, FIG. 14B shows the difference compressed message, FIG. 14C shows the FP compressed message, and FIG. 14D shows the non-compression target message.

In FIG. 14A, the data is loaded on the message body, whereas in FIG. 14B, the information for recovering the data is loaded on the message body instead of the data, and in FIG. 14C, the fingerprint (FP) is loaded on the message body instead of the data.

Also, in this example, an identification information for enabling identification of the type of the message is described in a message header (at the compression side proxy), and the presence or absence of the FP compression or the differential compression is identified according to this identification information (at the decompression side proxy) (the compression is absent if it is 01, the differential compression is present if it is 10, and the FP compression is present if it is 11, for example). Note that the identification information can be a special one to be used between proxies or one that utilizes a field already existing in the ordinary HTTP message header, either independently or in combination with the original purpose of that field.

Note that, in the case where messages that are not targets for applying the FP compression can exist, it is possible to include the above described identification information (with a value 00, for example) in the message header of the message that is not a target for applying the FP compression as shown in FIG. 14D, at the compression side (transmitting side) proxy.

Also, in the case where messages that are not targets for applying the FP compression can exist, when the decompression side (receiving side) proxy is capable of judging that this message is a message that is not a target for applying the FP compression according to some information contained in the message header or judging that this message is a message that is not a target for applying the FP compression as the message body is null, it is possible to use a configuration in which the identification information is not included in the message header of the message that is not a target for applying the FP compression.

Figure 40:
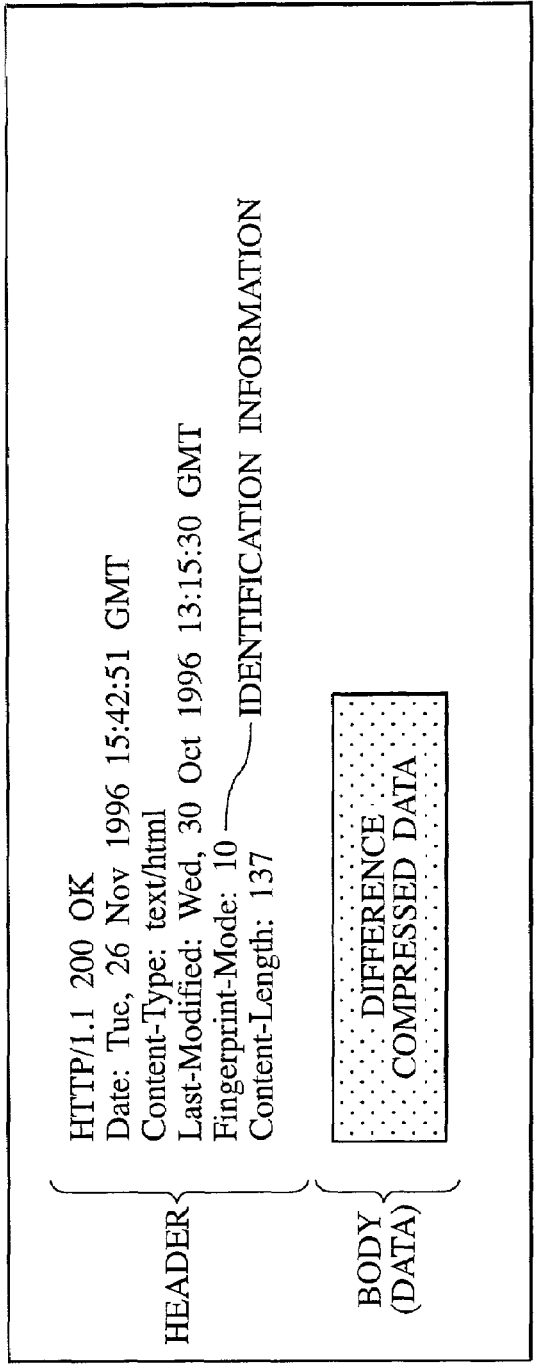
FIG. 40 a diagram showing a concrete example of a message in a message format shown in FIG. 14B.
Figure 41:
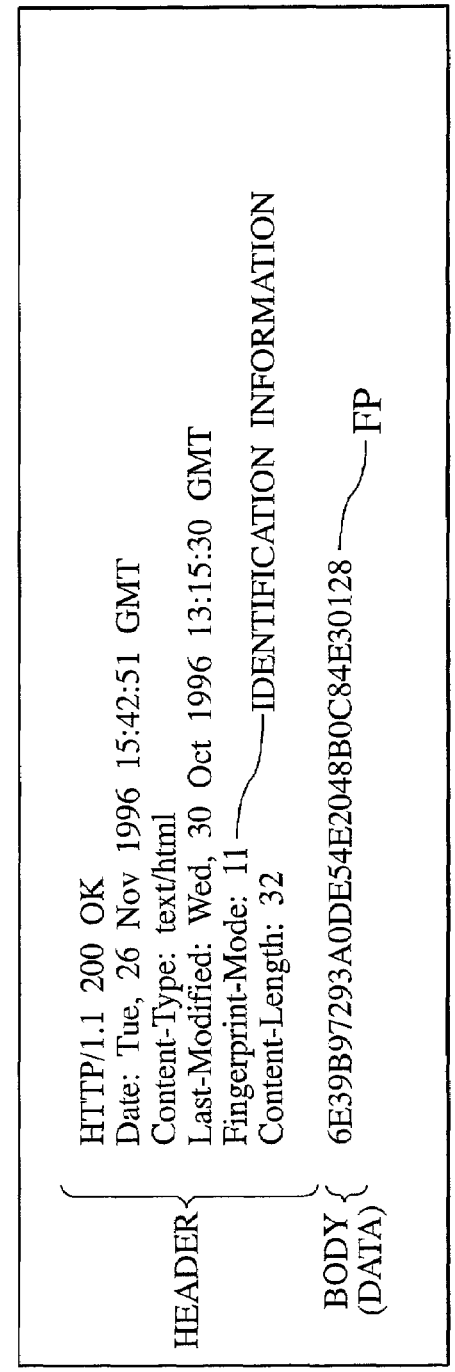
FIG. 41 a diagram showing a concrete example of a message in a message format shown in FIGS. 14C and 15C.

Here, a concrete example of a message in the format of FIG. 14A is shown in FIG. 39, a concrete example of a message in the format of FIG. 14B is shown in FIG. 40, a concrete example of a message in the format of FIG. 14C is shown in FIG. 41, and a concrete example of a message in the format of FIG. 14D is shown in FIG. 42. In FIGS. 39, 40, 41 and 42, "Fingerprint-Mode: . . . " in the header of each figure corresponds to the identification information, and "6E39 . . . 0128" in the body of FIG. 41 corresponds to the fingerprint.

Figure 15A:
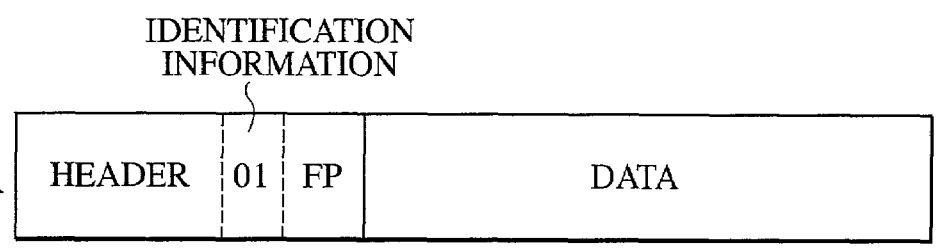
FIGS. 15A, 15B and 15C are diagrams showing another exemplary message formats that can be used in one embodiment of the present invention.
Figure 15B:
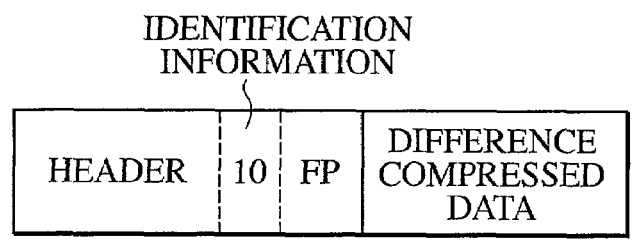
Figure 15C:
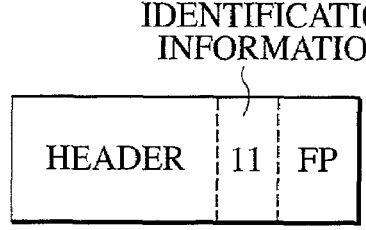

Note that, in the example of FIGS. 14A and 14B, the fingerprint of the data is not included in the message in the case of the non-compression or the differential compression, but it is also possible to include the fingerprint of the data in the message header (or it is also possible to include the fingerprint of the data in the message body). FIGS. 15A, 15B and 15C show examples in which the fingerprint is included in the message header in the case of the non-compression or the differential compression, and the fingerprint is included in the message body in the case of the FP compression. In this way, it is possible to omit a task to obtain the fingerprint from the data again at a time of carrying out the registration of the data into the fingerprint cache at the decompression side, because the fingerprint included in the message can be utilized directly.

Figure 44:
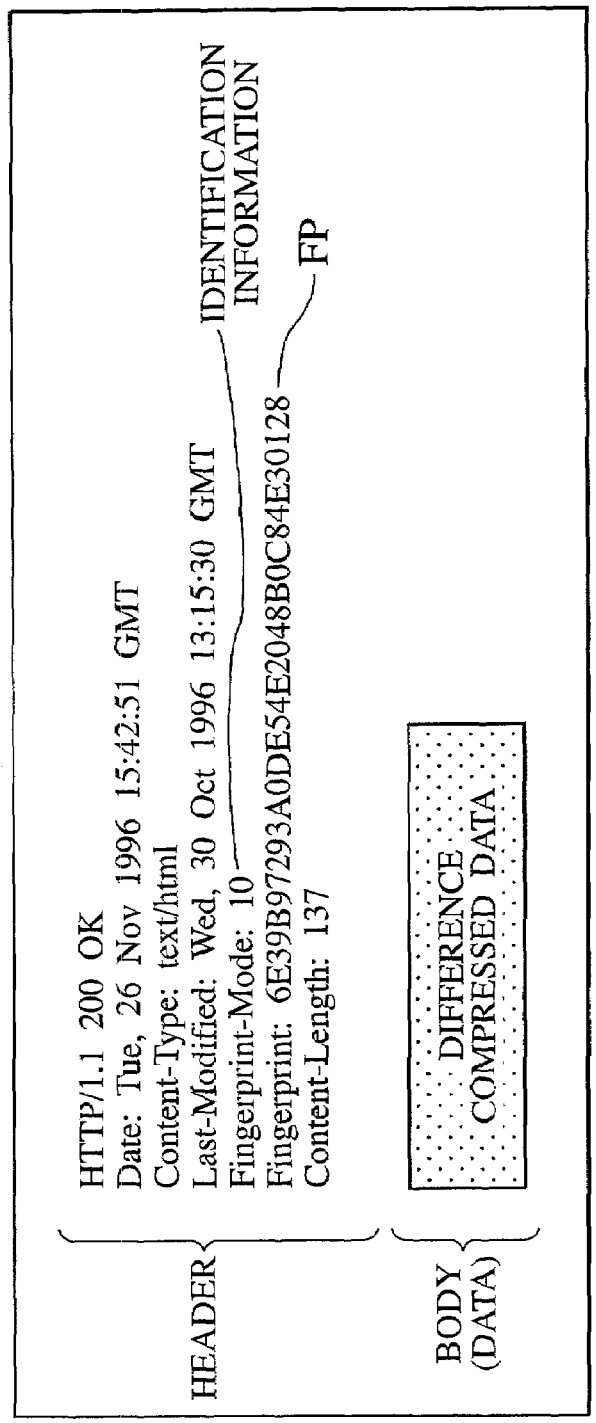
FIG. 44 a diagram showing a concrete example of a message in a message format shown in FIG. 15B.

Here, a concrete example of a message in the format of FIG. 15A is shown in FIG. 43, and a concrete example of a message in the format of FIG. 15B is shown in FIG. 44. A concrete example of a message in the format of FIG. 15C is the same as that of FIG. 41. In FIGS. 43 and 44, "Fingerprint: . . . " in the header corresponds to the fingerprint.

Figure 16:
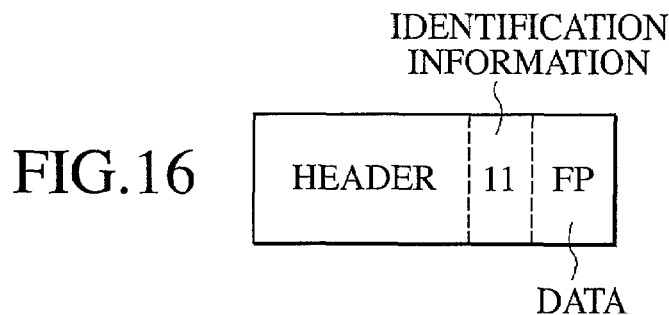
FIG. 16 is a diagram showing another exemplary message format that can be used in one embodiment of the present invention.
Figure 45:
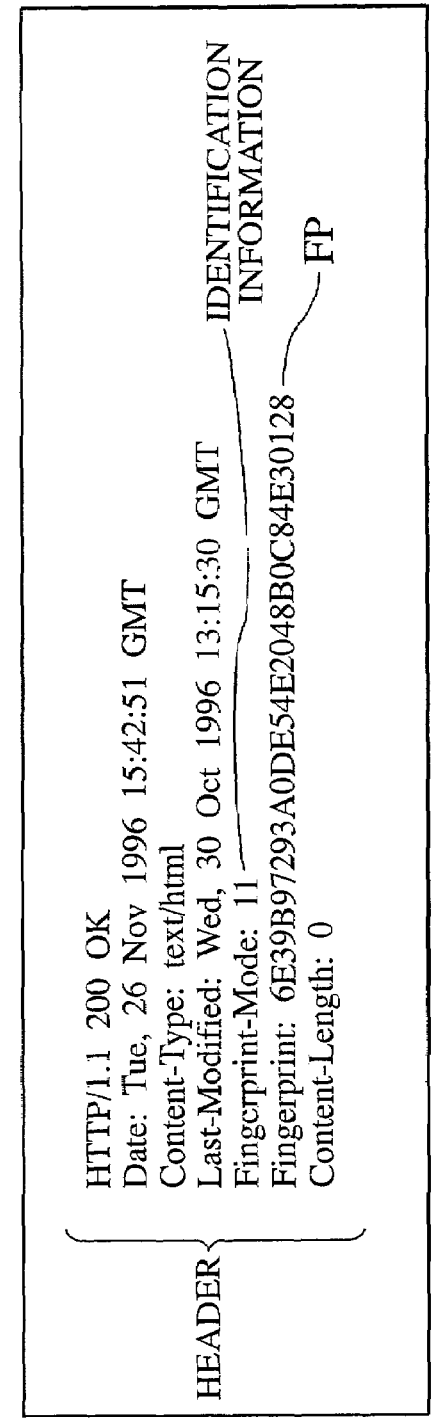
FIG. 45 a diagram showing a concrete example of a message in a message format shown in FIG. 16.

Note that, in any of the above described cases, it is also possible to include the fingerprint (FP) in the message header and make the message body null for the FP compressed message, as shown in FIG. 16. A concrete example of a message in the format of FIG. 16 is shown in FIG. 45.

Note also that various message formats other than those described above can be used.

Figure 17A:
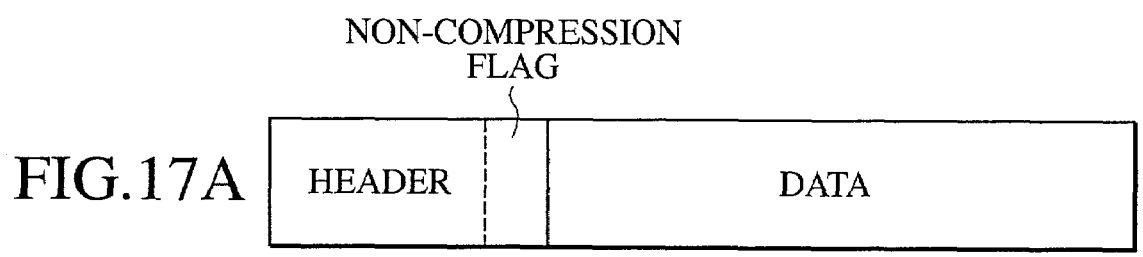
FIGS. 17A, 17B and 17C are diagrams showing another exemplary message formats that can be used in one embodiment of the present invention.
Figure 17B:
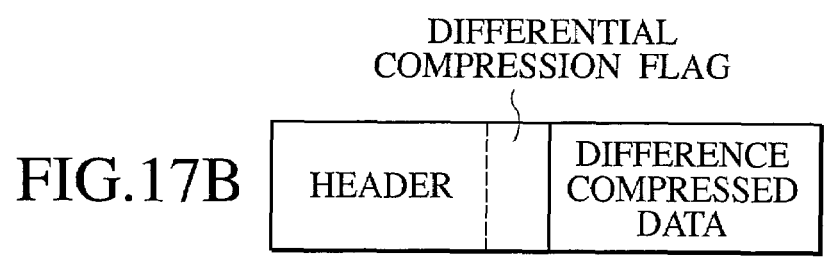
Figure 17C:
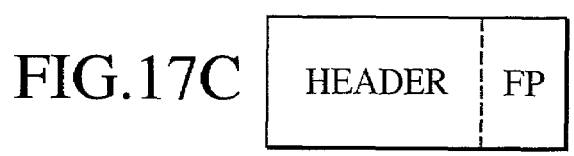

For example, FIG. 17A shows a message format in which the non-compression flag is described but the fingerprint is not described in the header of the non-compressed message, FIG. 17B shows a message format in which the differential compression flag is described but the fingerprint is not described in the header of the difference compressed message, and FIG. 17C shows a message format in which the fingerprint is described in the header but the body is made to be null in the FP compressed message.

In this case, the message can be identified as the FP compressed message by detecting that the message body is null or that the fingerprint is described in the message header. Also, the message can be identified as the non-compressed message or the difference compressed message by detecting that the non-compression flag or the differential compression flag is described in the message header.

Figure 47:
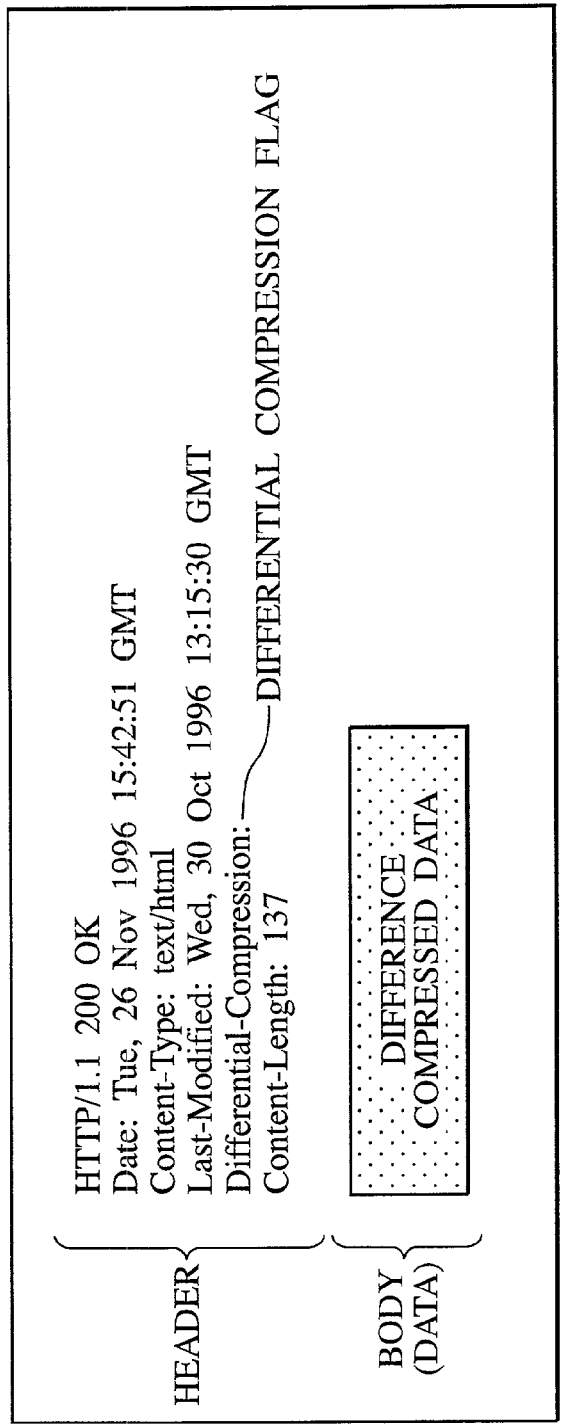
FIG. 47 a diagram showing a concrete example of a message in a message format shown in FIG. 17B.
Figure 48:
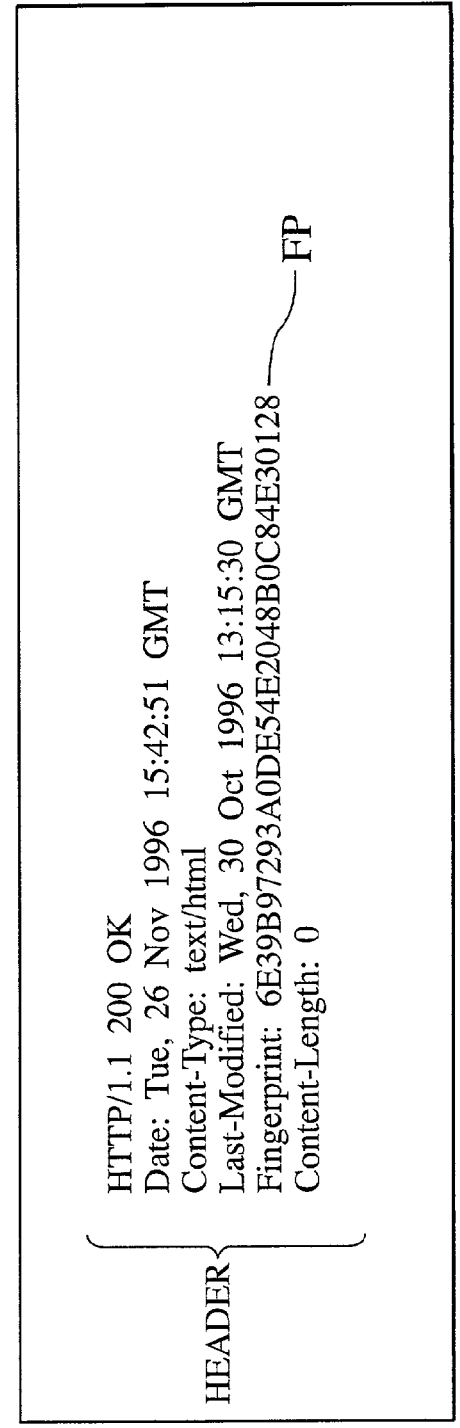
FIG. 48 a diagram showing a concrete example of a message in a message format shown in FIG. 17C.

Here, a concrete example of a message in the format of FIG. 17A is shown in FIG. 46, a concrete example of a message in the format of FIG. 17B is shown in FIG. 47, and a concrete example of a message in the format of FIG. 17C is shown in FIG. 48. In FIG. 46, "Non-Compression: . . . " in the header corresponds to the non-compression flag, and in FIG. 47, "Differential-Compression: . . . " in the header corresponds to the differential compression flag.

Figure 18A:
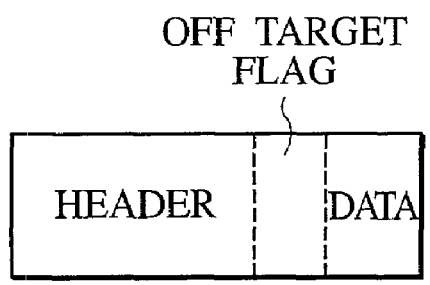
FIGS. 18A, 18B, 18C and 18D are diagrams showing another exemplary message formats that can be used in one embodiment of the present invention.
Figure 18B:
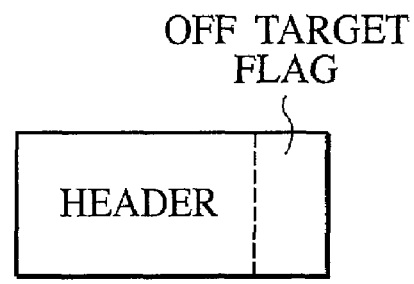

Note that, in the case where messages that are not targets for applying the FP compression can exist, it is possible to include an off target flag in the message header of the message that is not a target for applying the FP compression as shown in FIGS. 18A and 18B (where FIG. 18A shows the case where the data is not null and FIG. 18B shows the case where the data is null) at the compression side (transmitting side) proxy.

Figure 18C:
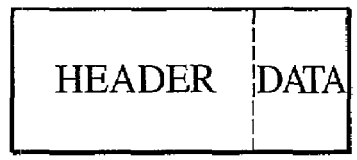
Figure 18D:

Also, in the case where messages that are not targets for applying the FP compression can exist, when the decompression side (receiving side) proxy is capable of judging that this message is a message that is not a target for applying the FP compression according to some information contained in the message header at the decompression side (receiving side) proxy, it is possible to use a configuration in which an off target flag is not included in the message header of the message that is not a target for applying the FP compression as shown in FIGS. 18C and 18D (where FIG. 18C shows the case where the data is not null and FIG. 18D shows the case where the data is null).

Here, a concrete example of a message in the format of FIG. 18A is shown in FIG. 49, a concrete example of a message in the format of FIG. 18B is shown in FIG. 50, a concrete example of a message in the format of FIG. 18C is shown in FIG. 51, and a concrete example of a message in the format of FIG. 18D is shown in FIG. 52. In FIGS. 49 and 50, "No-FP-Compression: . . . " in the header corresponds to the off target flag.

In the following, the operation in the case of applying the FP compression/decompression to the reply data at a time of transferring the reply message from the server side proxy 230 to the client side proxy 240 will be described in detail.

Figure 19:
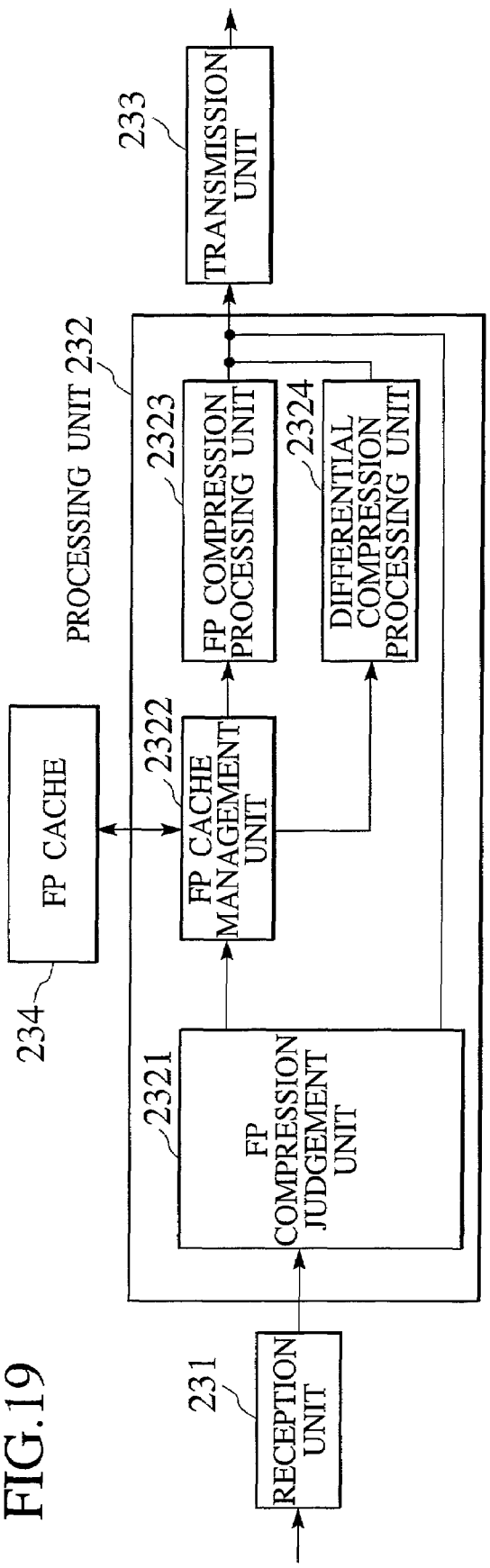
FIG. 19 is a block diagram showing one exemplary configuration of a server side proxy according to one embodiment of the present invention.
Figure 20:
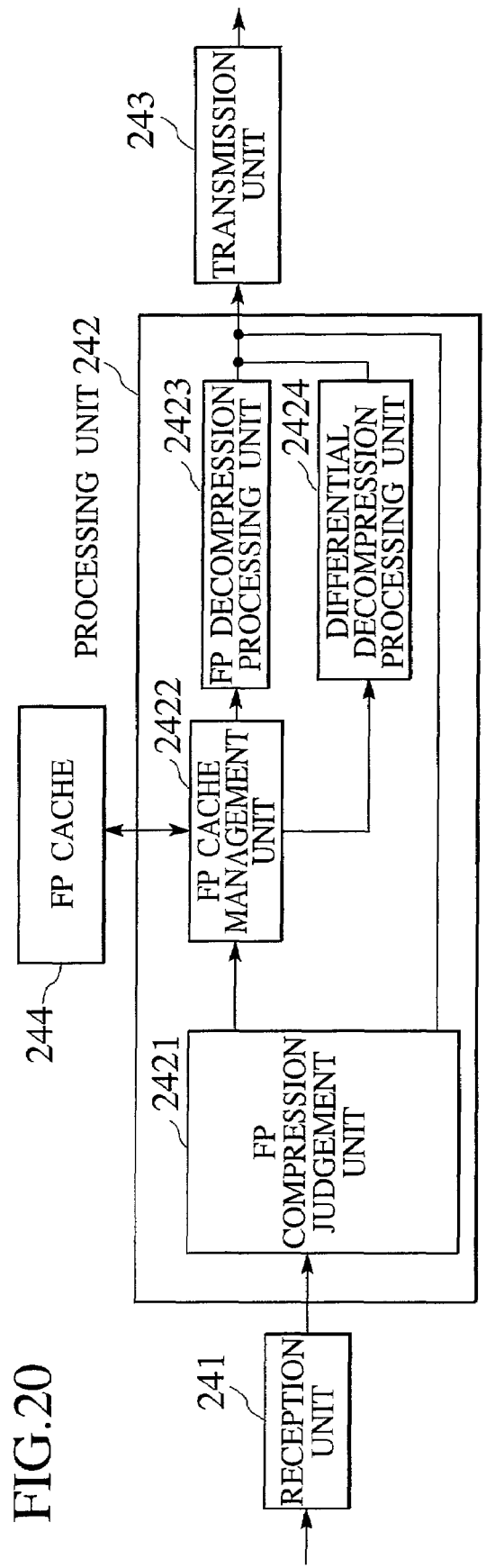
FIG. 20 is a block diagram showing one exemplary configuration of a client side proxy according to one embodiment of the present invention.

FIG. 19 shows an exemplary configuration of the server side proxy 230 in this embodiment, and FIG. 20 shows an exemplary configuration of the client side proxy 240 in this embodiment. Note that FIG. 19 and FIG. 20 mainly show configurations relevant to the data transfer from the server side proxy 230 to the client side proxy 240.

As shown in FIG. 19, the server side proxy 230 has a reception unit 231 for carrying out a processing for receiving a transfer message from the LAN 212 inside the ASP server center 202 or the wide area network 214, a processing unit 232 for applying the FP compression or the differential compression to data contained in the transfer message, a transmission unit 233 for carrying out a processing for transmitting the transfer message to the LAN 212 inside the ASP server center 202 or the wide area network 214, and a fingerprint cache (FP cache) 234 for storing the fingerprint and its source data in correspondence. Also, the processing unit 232 has a fingerprint (FP) compression judgement unit 2321 for judging whether the data contained in the transfer message should be a compression target or not, a fingerprint cache (FP cache) management unit 2322 for carrying out the search and the registration with respect to the fingerprint cache 234, a fingerprint (FP) compression processing unit 2323 for carrying out a processing for replacing the data contained in the transfer message with the corresponding fingerprint, and a differential compression processing unit 2324 for carrying out a processing for replacing the data contained in the transfer message with the difference compressed data.

As shown in FIG. 20, the client side proxy 240 has a reception unit 241 for carrying out a processing for receiving a transfer message from the LAN 216 inside the user's office 204 or the wide area network 214, a processing unit 242 for applying the FP decompression to data contained in the transfer message, a transmission unit 243 for carrying out a processing for transmitting the transfer message to the LAN 216 inside the user's office 204 or the wide area network 214, and a fingerprint cache (FP cache) 244 for storing the fingerprint and its source data in correspondence. Also, the processing unit 242 has a fingerprint (FP) compression judgement unit 2421 for judging whether the data contained in the transfer message should be a compression target or not and the presence or absence of the FP compression or the differential compression with respect to the transfer message, a fingerprint cache (FP cache) management unit 2422 for carrying out the search and the registration with respect to the fingerprint cache 244, a fingerprint (FP) decompression processing unit 2423 for carrying out a processing for decompressing the original data from the fingerprint contained in the FP compressed transfer message, and a differential decompression processing unit 2424 for carrying out a processing for decompressing the original data from the difference compressed data contained in the difference compressed transfer message.

Note that the FP compression judgement unit 2321 on the compression side and the FP compression judgement unit 2421 on the decompression side judge whether the data contained in that message should be a target for applying the FP compression or not, by checking whether the message satisfies a prescribed condition or not as described above. In the case of setting every message as a target for applying the FP compression, the FP compression judgement unit 2321 on the compression side and the corresponding part of the exemplary procedure to be described below are unnecessary, and the FP compression judgement unit 2421 on the decompression side and the corresponding part of the exemplary procedure to be described below are also unnecessary. Note also that the FP compression judgement unit 2421 on the decompression side judges whether the data of the message that is a target for applying the FP compression is FP compressed or not.

In the following, the case of transferring the message that is a target for applying the FP compression (the case in which the message is judged as a target for applying the FP compression or the case in which every message is set as a target for applying the FP compression) will be mainly described.

Figure 21:
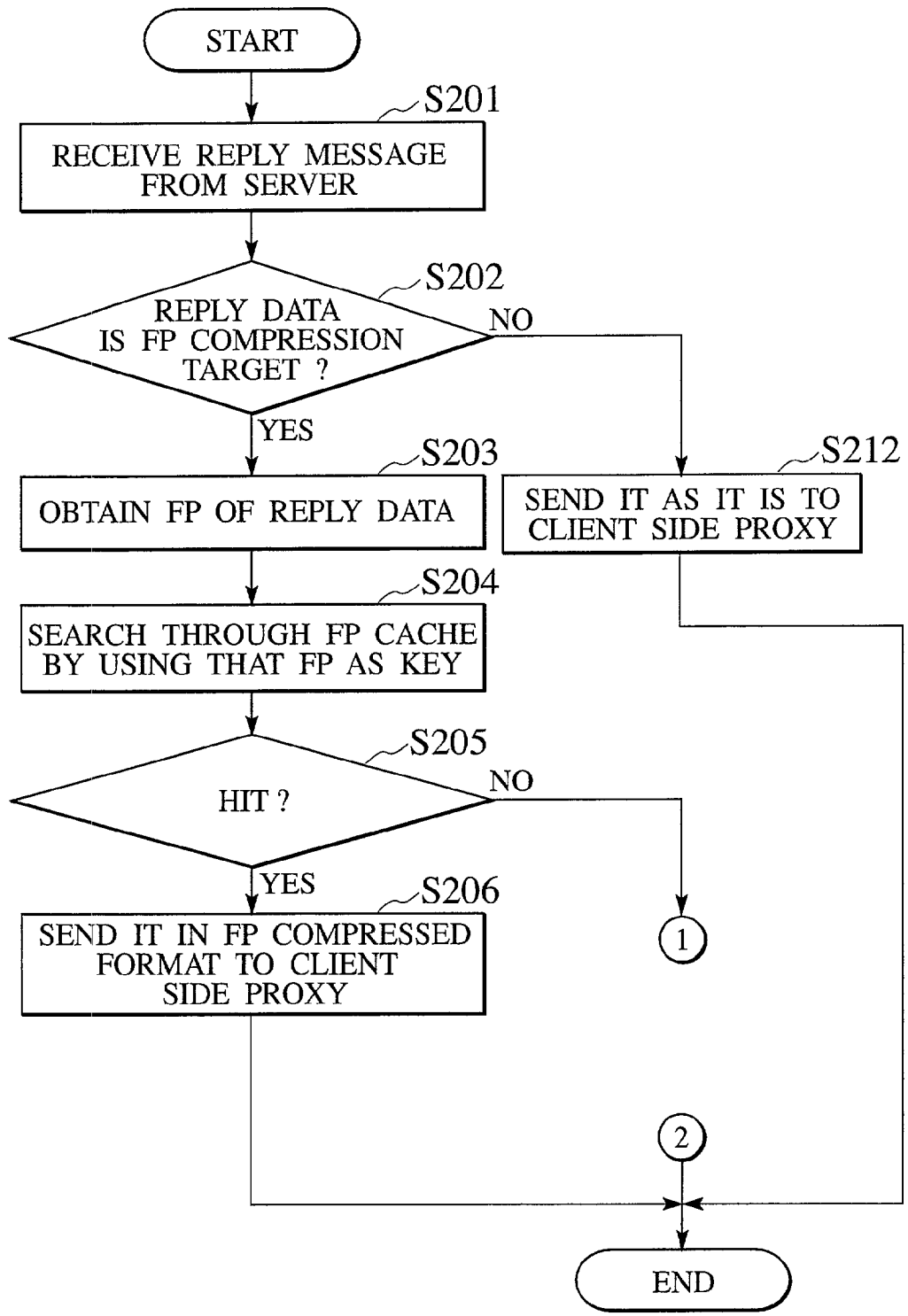
FIG. 21 is a flow chart showing one exemplary processing procedure of the server side proxy of FIG. 19 according to one embodiment of the present invention.
Figure 22:
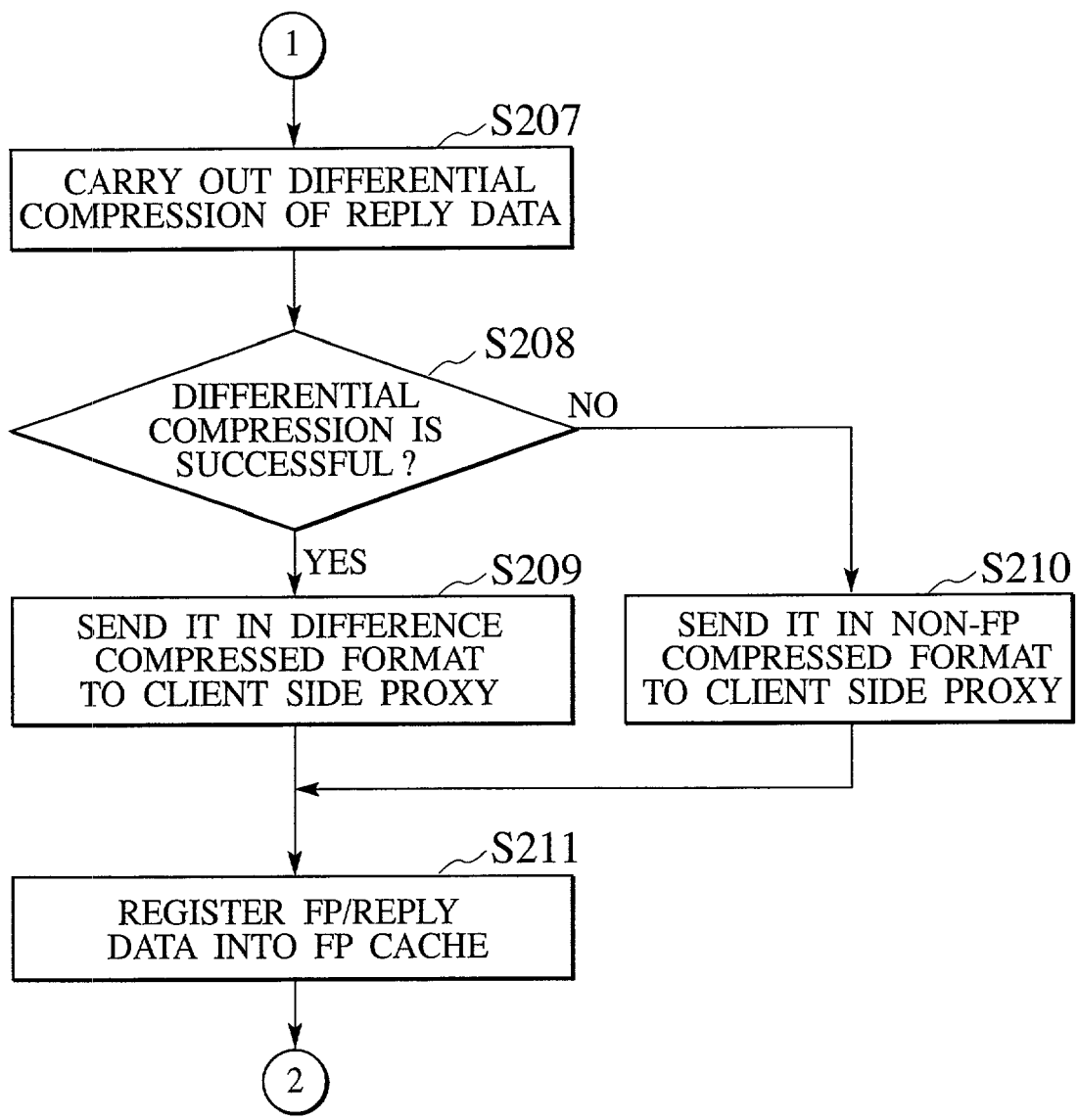
FIG. 22 is a flow chart showing another exemplary processing procedure of the server side proxy of FIG. 19 according to one embodiment of the present invention.

FIGS. 21 and 22 show an exemplary processing procedure of the server side proxy 230 at a time of transferring the reply message from the server side proxy 230 to the client side proxy 240. Note that FIGS. 21 and 22 show the processing in the case of receiving one reply message, but in practice the server side proxy 230 carries out the processing shown in FIGS. 21 and 22 with respect to every received reply message.

The server side proxy 230 receives the reply message from the server 220 at the reception unit 231 (step S201).

The FP compression judgement unit 2321 checks and judges whether the reply data of this reply message is a target for applying the FP compression or not (step S202). When the reply data is judged as not a target for applying the FP compression (step S202 NO), the received reply message is transferred to the client side proxy 240 from the transmission unit 233 (step S212).

When the reply data of this reply message is judged as a target for applying the FP compression at the step S202, the fingerprint value of this reply data is calculated at the FP cache management unit 2322 (step S203), and the fingerprint cache 234 is searched through by using this fingerprint value as a key (step S204).

When a set of this fingerprint value and the corresponding data is registered in the fingerprint cache 234 (step S205 YES), the received reply message is converted into the FP compression format (of FIG. 16, for example) by using this fingerprint value at the FP compression processing unit 2323, and transmitted to the client side proxy 240 from the transmission unit 233 (step S206).

On the other hand, when a set of this fingerprint value and the corresponding data is not registered in the fingerprint cache 234 as a result of the search of the step S4 (step S205 NO), the differential compression is carried out (step S207) and whether the differential compression is successful or not is judged at the differential compression processing unit 2324 (step S208).

Whether the differential compression is successful or not is judged by comparing the amount of data r0 of the original data that is a target of the differential compression and the amount of data r1 of the difference compressed data and judging that it is successful if r0−r1>d, where a constant d is a prescribed integer greater than or equal to 0, for example.

When it is judged that the differential compression is successful at the step S208, the following two operations are carried out.

(1-1) The received reply message is converted into the differential compression format (of FIG. 15B, for example) (by using this fingerprint value according to the need) at the differential compression processing unit 2324, and transmitted to the client side proxy 240 from the transmission unit 233 (step 209).

(1-2) This fingerprint value and this reply data are set in correspondence (the fingerprint value is set as a key) and registered into the fingerprint cache 234 at the FP cache management unit 2322 (step S211).

Note that these operations (1-1) and (1-2) can be carried out in any desired order or in parallel.

On the other hand, when it is judged that the differential compression is failure at the step S208, the following two operations are carried out.

(2-1) The received reply message is converted into a non-compression format (of FIG. 15A, for example) at the differential compression processing unit 2324, and transmitted to the client side proxy 240 from the transmission unit 233 (step S210).

(2-2) This fingerprint value and this reply data are set in correspondence (the fingerprint value is set as a key) and registered into the fingerprint cache 234 at the FP cache management unit 2322 (step S211).

Note that, in the above described (2-1), the received reply message can be converted into a non-compression format at the FP compression processing unit 2323 rather than the differential compression processing unit 2324.

Note also that these operations (2-1) and (2-2) can be carried out in any desired order or in parallel.

Figure 23:
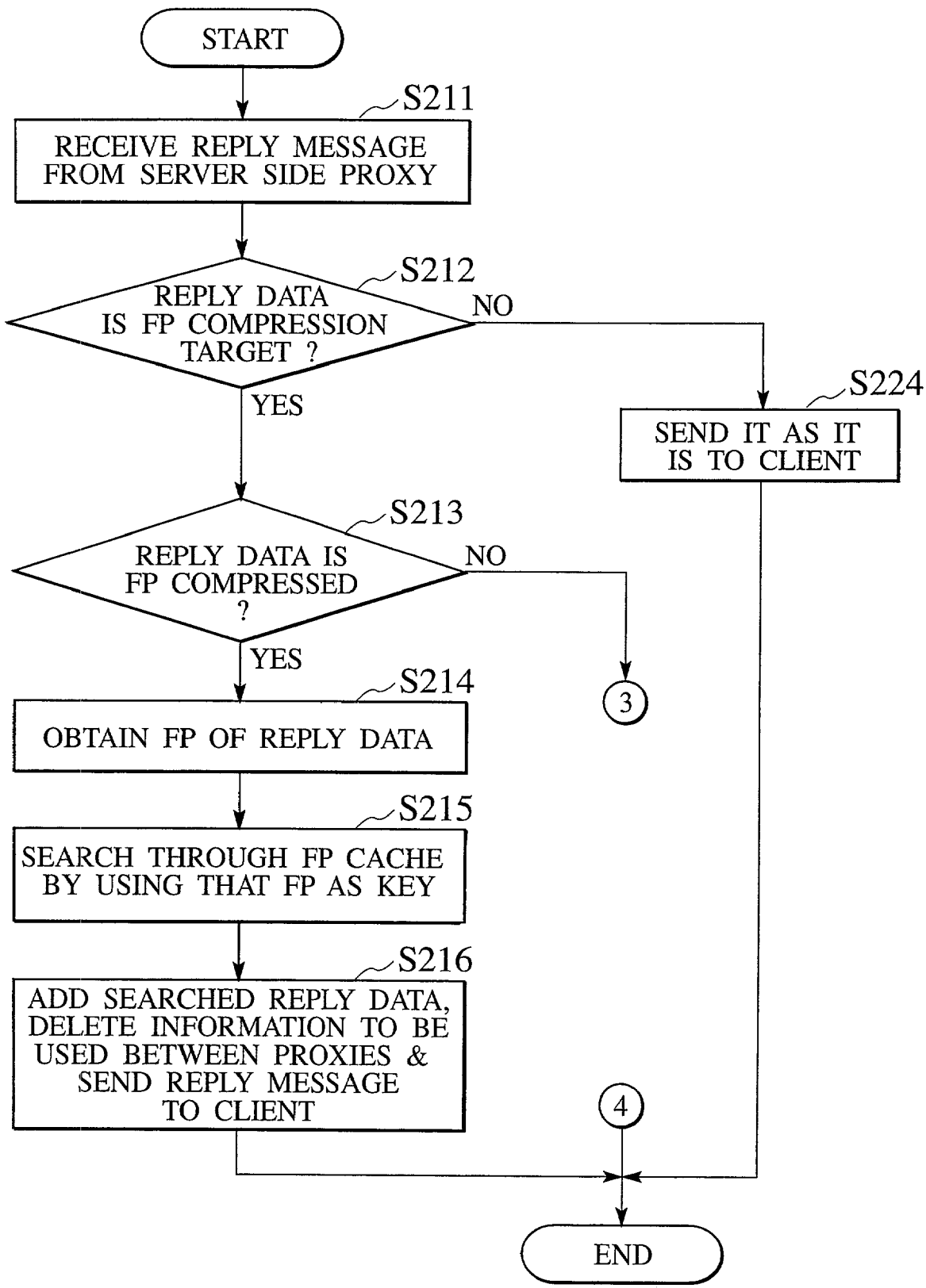
FIG. 23 is a flow chart showing one exemplary processing procedure of the client side proxy of FIG. 20 according to one embodiment of the present invention.
Figure 24:
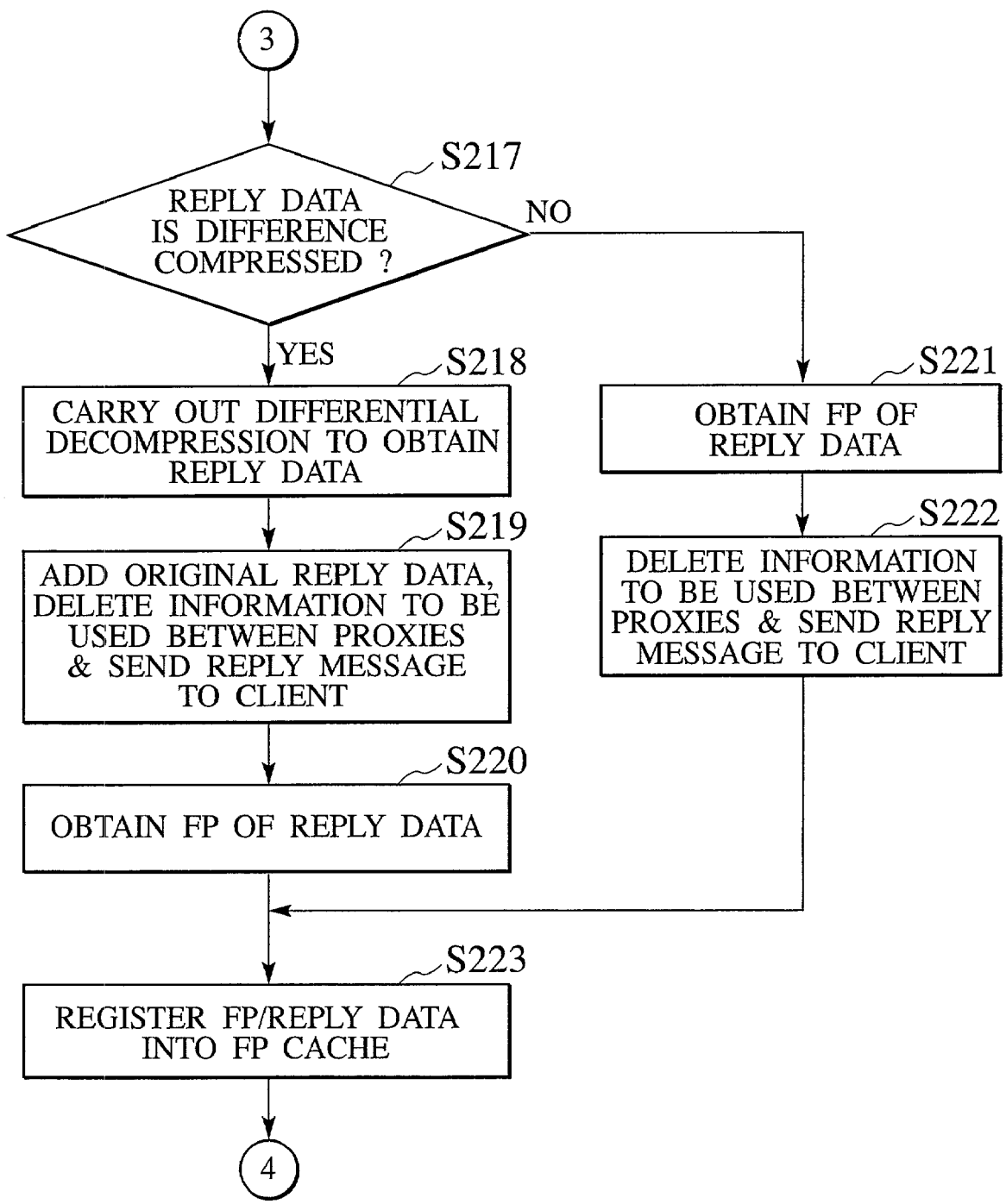
FIG. 24 is a flow chart showing another exemplary processing procedure of the client side proxy of FIG. 20 according to one embodiment of the present invention.

Next, FIGS. 23 and 24 show an exemplary processing procedure of the client side proxy 240 at a time of transferring the reply message from the server side proxy 230 to the client side proxy 240. Note that FIGS. 23 and 24 show the processing in the case of receiving one reply message, but in practice the client side proxy 240 carries out the processing shown in FIGS. 23 and 24 with respect to every received reply message.

The client side proxy 240 receives the reply message from the server side proxy 230 at the reception unit 241 (step S211).

The FP compression judgement unit 2421 checks and judges whether the reply data of this reply message is a target for applying the FP compression or not (step S212). When the reply data is judged as not a target for applying the FP compression (step S212 NO), the received reply message is transferred to the client 250 from the transmission unit 243 (step S224).

When the reply data of this reply message is judged as a target for applying the FP compression at the step S212, the FP compression judgement unit 2421 also checks and judges whether the reply data is FP compressed or not (step S213).

When the reply data of this reply message is judged as FP compressed (as shown in FIG. 16, for example) at the step S213, the fingerprint value of this reply data is obtained at the FP cache management unit 2422 (step S214), and the fingerprint cache 244 is searched through by using this fingerprint value as a key (step S215).

Then, the data corresponding to this fingerprint value obtained from the fingerprint cache 244 is attached to the received reply message and a special information to be used between the proxies is deleted in the case of using such an information at the FP decompression processing unit 2423, and the resulting reply message is transmitted to the client 250 from the transmission unit 243 (step S216).

On the other hand, when the reply data of this reply message is judged as not FP compressed (as shown in FIG. 15A or 15B, for example) at the step S213, the FP compression judgement unit 2421 also judges whether this reply data is difference compressed or not (step S217).

When it is judged that the reply data is difference compressed (as shown in FIG. 15B, for example) at the step S217, the following two operations are carried out.

(1-1) The difference compressed data is decompressed to recover the original reply data (after searching and acquiring the reference data at the FP cache management unit 2422), the recovered reply data is added to the reply message, the special information to be used between the proxies is deleted from the received reply message in the case of using such an information at the differential decompression processing unit 2424, and the resulting reply message is transmitted to the client 250 from the transmission unit 243 (step S219).

(1-2) The fingerprint value of this reply data is obtained (step S220), and this fingerprint value and this reply data are set in correspondence (the fingerprint value is set as a key) and registered into the fingerprint cache 244 at the FP cache management unit 2422 (step S223).

On the other hand, when it is judged that the reply data is not difference compressed (as shown in FIG. 15A, for example) at the step S217, the following two operations are carried out.

(2-1) The special information to be used between the proxies is deleted from the received reply message in the case of using such an information at the differential decompression processing unit 2424, and the resulting reply message is transmitted to the client 250 from the transmission unit 243 (step S222).

(2-2) The fingerprint value of this reply data is obtained (step S221), and this fingerprint value and this reply data are set in correspondence (the fingerprint value is set as a key) and registered into the fingerprint cache 244 at the FP cache management unit 2422 (step S223).

Note that, the above described (2-1) can be carried out by the FP decompression processing unit 2423 rather than the differential decompression processing unit 2424.

Note also that these operations (1-1) and (1-2) can be carried out in any desired order or in parallel, and that these operations (2-1) and (2-2) can be carried out in any desired order or in parallel.

Here, the step S214/S220/S221 can use a method for obtaining the fingerprint from the message when the fingerprint is described in the message or a method for calculating the fingerprint value by using the hash function or the like from the reply data when the fingerprint is not described in the message. It is also possible to use a method for calculating the fingerprint value from the reply data even when the fingerprint is described in the message.

Note also that it is possible to carry out the step S214/S220/S221 can be carried out at arbitrary timing before using the fingerprint. However, there is a need to carry out the calculation of the step S220 after the step S218 in the case of the latter method.

Note also that the judgements of the steps S212, S213 and S217 can be made simultaneously.

Next, the procedure for carrying out the differential compression will be described.

Figure 25:
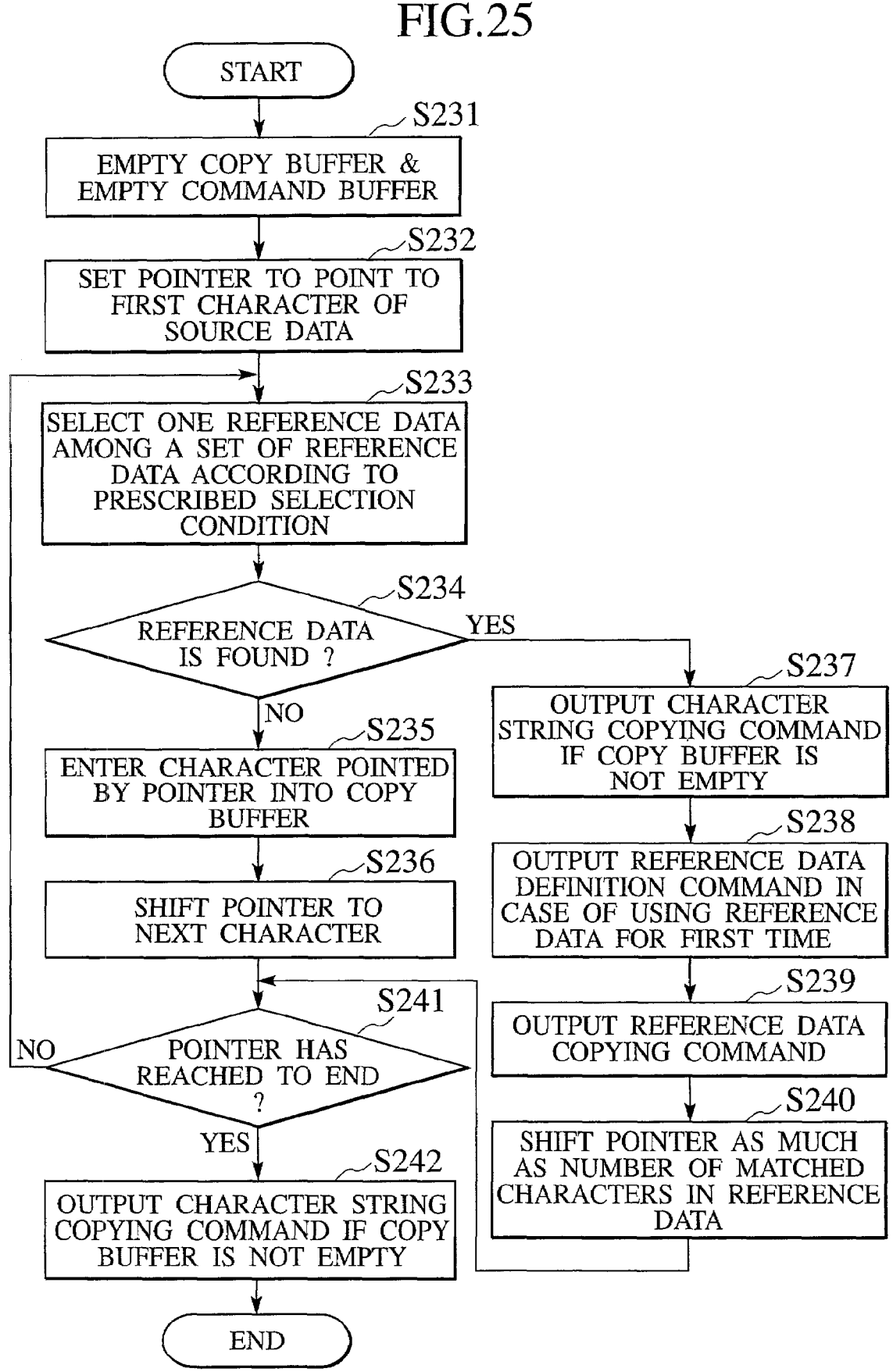
FIG. 25 is a flow chart showing one exemplary processing procedure of a differential compression according to one embodiment of the present invention.

FIG. 25 shows an exemplary procedure for the differential compression. This procedure is for the case of using three types of commands described above.

Here, it is assumed that a log table in which the recently accessed ones among the data registered in the fingerprint cache are arranged in an order will be utilized. It is not absolutely necessary for this log table to record the fingerprints of all the data registered in the fingerprint cache. For example, it suffices for this log table to record a prescribed number of the fingerprints (in which case, the number of the fingerprints to be recorded is predetermined by conjecturing an effective number for the purpose of using them as the reference data of the differential compression, for example).

Of course, it is also possible to use one or a plurality of criteria other than the recent access order as criteria for the recording into the log table, and it is also possible to use one or a plurality of criteria in addition to the criterion based on the recent access order.

Note that it is also possible to provide the log table integrally with the fingerprint cache.

(Step S231)

First, the working copy buffer and command buffer are emptied.

According to the content copied to this copy buffer, the commands of FIGS. 6A to 6C are produced and written into the command buffer. Eventually, the array of the commands written into the command buffer specifies the difference compressed data.

(Step S232)

The data that is a target of the differential compression is handled as a character string and a pointer for pointing a character on that character string is provided. At first, the pointer is set to point to the first character in that character string.

In the following, the loop processing will be executed until it is judged that the point reached to the last character in that character string at the step S241.

(Step S233)

The data corresponding to the fingerprints recorded in the log table are taken out sequentially from a newer one, and the data that matches for more than a prescribed length with a portion from a location pointed by the pointer in the differential compression target data is taken out as the reference data.

Note that there are various methods available for the method for determining the reference data. For example, there is a method for checking the data corresponding to the fingerprints recorded in the log table sequentially from a newer one and taking out the first data that matched for more than a prescribed length as the reference data, and there is also a method for checking all the data corresponding to the fingerprints recorded in the log table and taking out the data with the longest matched length (provided that it is matched for more than a prescribed length) as the reference data.

(Step S234)

If the reference data is found, the processing proceeds to the step S237. If the reference data is not found, the processing returns to the step S235.

(Step S237)

When the reference data is found at the step S234, if the copy buffer is not empty, the directly specifying copying command of FIG. 6C corresponding to the character string in the copy buffer is produced and written into the command buffer. The copy buffer is then emptied. If the copy buffer is empty, no further operation is carried out.

(Step S238)

If the definition of the reference data of FIG. 6A corresponding to the reference data found at the step S233 is not yet written into the command buffer, this reference data definition is written into the command buffer.

(Step S239)

A command for copying the character string that matched in the reference data is written into the command buffer as the copying command of FIG. 6B.

(Step S240)

The pointer is shifted forwards as much as the length of the character string that matched in the reference data.

(Step S235)

On the other hand, when the reference data is not found at the step S234, the character pointed by the pointer is entered into the copy buffer.

(Step S236)

The pointer is shifted forwards for the length of one character.

(Step S241)

If the pointer has not reached to the end of the differential compression target data (if the unprocessed data portion is remaining), the processing returns to the step S233. If the pointer has reached to the end of the differential compression target data (if the unprocessed data portion is not remaining), the processing proceeds out of the processing loop to the step S242.

(Step S242)

If the copy buffer is not empty, the directly specifying copying command of FIG. 6C corresponding to the character string in the copy buffer is produced and written into the command buffer. The copy buffer is then emptied. If the copy buffer is empty, no further operation is carried out.

The content of the command buffer at this point specifies the differential compression data.

Note that, as described above, in practice the fact that the data size resulting from the differential compression is smaller than the data size before the differential compression (or that the data size resulting from the differential compression is smaller than a certain level (by a certain amount of compression)) is confirmed after the differential compression is carried out in this way. In the case where the data size does not become smaller by the differential compression (or the data size does not become smaller than a certain level (by a certain amount of compression)), the data will be transferred as it is because it is better not to apply the differential compression.

In the differential compression processing described above, the processing for selecting the latest data that has the character string that matches for more than a prescribed length at the step S233 is expected to be the most time consuming processing. In order to make this processing faster, it is possible to utilize a hash table. All the character strings of the prescribed length are taken out from the data to be entered into the log table, and their hash values (such as that obtained by summing codes of all the characters) is calculated and registered into the hash table. This hash table will be overwritten by the latest data if there is data that has the same hash value.

Using this hash table, the hash value of the character string in the prescribed length from a current position of the pointer in the differential compression target data is obtained, and data obtained by looking up the hash table by using that hash value is set as the first candidate data to be selected at the step S233. Here, there can be cases where the same hash value is produced from different character strings so that whether the character strings are really the same or not is checked by actually comparing the character strings and if they are not the same, the next candidate is searched by looking up the data in the log table sequentially, for example.

Another method for making the processing of the step S233 faster is a method for carrying out the comparison processing in units of rows. Unlike the procedure of FIG. 25 in which the comparison processing is carried out in units of characters, a sequence of hash values for each row in every data registered in the log table are calculated in advance. Also, a sequence of hash values for each row in the differential compression target data is calculated first. Thereafter, the processing is carried out similarly as the procedure of FIG. 25 except that the comparison is made in units of the hash values for rows rather than in units of characters. This method uses rows as units so that the number of comparisons can be reduced compared with the case of using characters as units. However, the comparison is made by using the hash values and there can be cases where the same hash value is produced from different rows, so that it is preferable to eventually judge whether the rows are really the same or not by actually comparing the rows after judging that the hash values are the same.

Of course, it is possible to combine such a configuration for carrying out the comparison in units of rows with the above described hashing technique. In such a case, it suffices to groups a plurality of consecutive rows together, and register them into the hash table in units of the smallest number of rows that is greater than or equal to the prescribed length.

Figure 26:
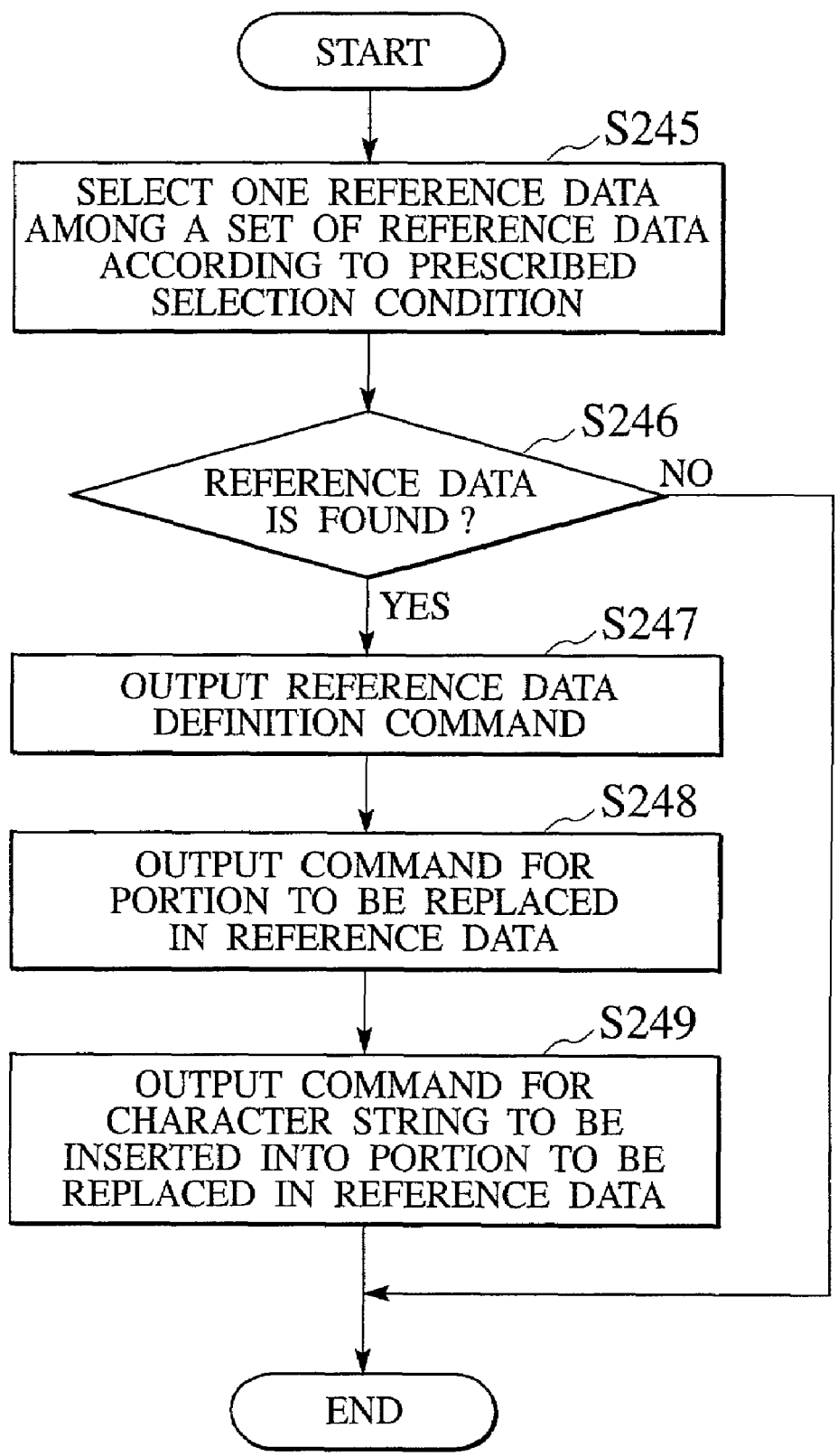
FIG. 26 is a flow chart showing another exemplary processing procedure of a differential compression according to one embodiment of the present invention.

Next, FIG. 26 shows another exemplary procedure for the differential compression. This procedure is for the case where one of the data registered in the fingerprint cache is selected as the reference data and the value of the fingerprint corresponding to the reference data and the information indicating the difference between the transfer data and the reference data are to be transferred between the proxies.

Here, again, it is assumed that the log table as described above is to be used.

First, one of the data corresponding to the fingerprints recorded in the log table that satisfies a prescribed criterion is selected as the reference data (step S245).

The prescribed criterion can be such that data which is selectable as the reference data is set to be data among the differential compression target data for which the amount of data that do not match with the data to be the reference data is less than or equal to a prescribed amount of data and a number of divided lumps when the reference data is divided into a plurality of lumps by portions that do not match is less than or equal to a prescribed number, for example.

There are various methods available for the method for determining the reference data as described above, such as a method for checking the data corresponding to the fingerprints recorded in the log table sequentially from a newer one and taking out the first data that matched for more than a prescribed length as the reference data, and a method for checking all the data corresponding to the fingerprints recorded in the log table and taking out the data for which the amount of data that do not match or the number of the divisions is smallest as the reference data, for example.

When the reference data is found (step S246 YES), a command (of FIG. 6A, for example) for the reference data definition is written into the command buffer (step S247).

A command (in a format similar to that of FIG. 6B in which the command identifier of the first byte is changed, for example) indicating a portion that does not match (a portion to be replaced by the directly specified data) in the reference data is written into the command buffer (step S248).

A command (of FIG. 6C, for example) for directly specifying data to be inserted into a portion that does not match in the reference data is written into the command buffer (step S249).

Note that when there are a plurality of portions to be replaced, the steps S248 and the step S249 will be executed as many times as the number of portions to be replaced.

The content of the command buffer at this point specifies the differential compression data.

On the other hand, if the reference data is not found (step S246 NO), the differential compression will not be carried out.

Note that, in the above description of FIG. 25 and FIG. 26, it is assumed that the log table is provided separately from the fingerprint cache, but it is also possible to provide the log table integrally with the fingerprint cache.

Also, the above description is directed to the case of using the log table, but there are also various methods that do not use the log table, such as a method in which the fingerprint cache is checked in a prescribed order (an order of entries or a random order, for example) up to a prescribed upper limit and the best one among them is used, and a method in which the fingerprint cache is checked in a prescribed order (an order of entries or a random order, for example) and the reference data is determined when the first data that satisfies a prescribed condition is found, for example.

It is also possible to maintain the URL for the reply message that contained the reply data used at a time of registering the fingerprint, in addition to the fingerprint, in the log table or the fingerprint cache. Then, at a time of searching the reference data, whether or not data having the same URL as the URL for the reply message that contains the differential compression target reply data is registered in the log table or the fingerprint cache can be checked first, and if it is registered, whether that data having the same URL can be used as the reference data at a higher priority than the other data or not can be checked.

Of course, various differential compression procedures other than those of FIG. 25 and FIG. 26 are available.

Figure 27:
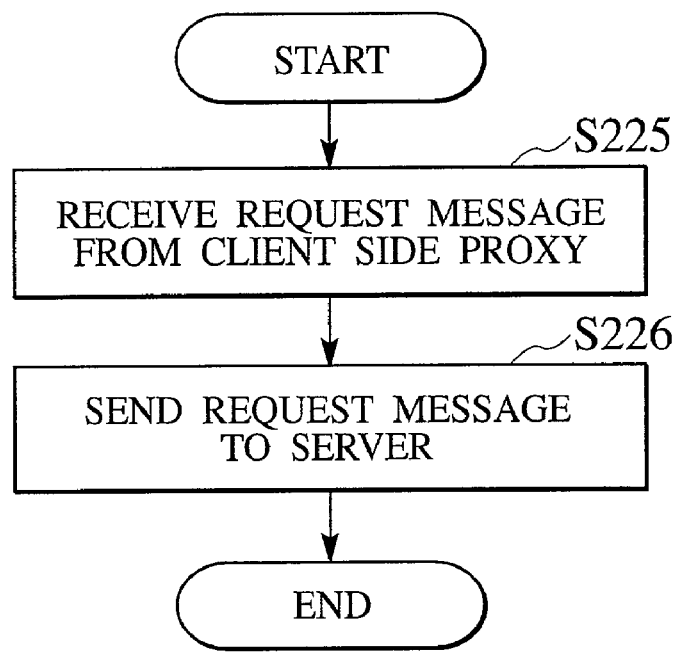
FIG. 27 is a flow chart showing another exemplary processing procedure of the server side proxy of FIG. 19 according to one embodiment of the present invention.
Figure 28:
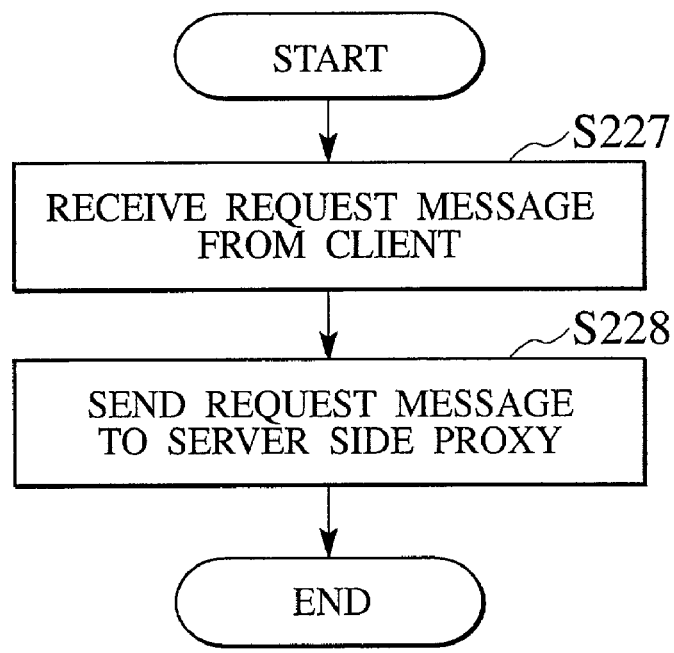
FIG. 28 is a flow chart showing one exemplary processing procedure of the client side proxy of FIG. 20 according to one embodiment of the present invention.

Note also that, in the case of not using the fingerprint cache at a time of transferring the request message from the client side proxy 240 to the server side proxy 230, the server side proxy 230 can carry out a procedure shown in FIG. 27 in which the server side proxy 230 receives the request message from the client side proxy 240 (step S225), and transmits it to the server 220 (step S226). Similarly, the client side proxy 240 can carry out a procedure shown in FIG. 28 in which the client side proxy 40 receives the request message from the client 250 (step S227) and transmits it to the server side proxy 230 (step S228).

In the following, the data transfer utilizing the fingerprint cache will be described in further detail with references to FIG. 29 (for a time of the registration, i.e., a time of the non-FP compression), FIG. 30 (for a time of the FP compression), and FIG. 31 (for a time of the registration, i.e., a time of the differential compression).

First, with reference to FIG. 29, the operation in the case of transferring data which is not registered in the fingerprint cache and for which the differential compression was unsuccessful, from the server side proxy 230 to the client side proxy 240 while registering this data into the fingerprint cache will be described.

(1) Suppose that the browser or the like on the client 250 issued the request message of the POST method to the server 220 by using the URL of "/A.cgi", for example. Here, the browser or the like is set in advance to send the request message for the server 220 to the client side proxy 240 first.

(2) The client side proxy 240 that received the request message from the client 250 transfers this request message to the server side proxy 230.

(3) The server side proxy 230 that received the request message transfers this request message to the server 220.

(4) The server 220 carries out a processing with respect to this request message, and then returns the reply message to the server side proxy 230.

(5) The server side proxy 230 that received the reply message calculates the fingerprint of the reply data contained in the received reply message first, and checks whether the data having this fingerprint name exists in the fingerprint cache 234 or not. If it does not exist, it is the first time data (including the case where it is the first time data after this data was registered into the fingerprint cache once and then deleted or invalidated later on, in the case of using a configuration in which the data that is once registered into the fingerprint cache can be deleted or invalidated later on), so that this data is entered (registered) into the fingerprint cache 34 by using the fingerprint as its name.

Note that, when the FP compression of the compression target data was unsuccessful, the differential compression processing is to be carried out and the differential compression is to be applied if the amount of data can be reduced by the differential compression of the reply data, but here it is assumed that the amount of data could not be reduced by the differential compression of the reply data.

(6) The server side proxy 230 transfers the reply message in which the data is loaded to the client side proxy 240.

Note that, as described above, when the reply message that contains the fingerprint value calculated from the reply data in the reply header or the like is sent, it is possible to omit a task for calculating the fingerprint again at the client side proxy 240.

(7) The client side proxy 240 that received the reply message registers the reply data into the fingerprint cache 244 because it is the first time data.

Note that, as described above, either the fingerprint is calculated from the reply data or the fingerprint that is entered into the reply header or the like by the server side proxy 230 is taken out and this fingerprint is registered as a name.

(8) The client side proxy 240 returns the reply message to (the browser or the like operating on) the client 250 (after deleting an information to be used only between the server side proxy 230 and the client side proxy 240 such as the fingerprint value in the case of a configuration in which such an information exists in the reply header or the like).

Note that the fingerprint cache registration of the above described (5) at the server side proxy 230 can be carried out after the operation of the above described (6). Also, the fingerprint cache registration of the above described (7) at the client side proxy 240 can be carried out after the operation of the above described (8).

Next, with reference to FIG. 30, the operation in the case of transferring data that is registered in the fingerprint cache by the operation of FIG. 29 from the server side proxy 230 to the client side proxy 240 will be described.

(1) to (4) are the same as (1) to (4) in the operation of FIG. 29.

(5) The server side proxy 230 that received the reply message from the server 220 calculates the fingerprint of the reply data contained in the received reply message first, and checks whether the data having this fingerprint name exists in the fingerprint cache 234 or not. Here it is registered in the fingerprint cache 234 so that the reply data is replaced with the fingerprint (by entering the fingerprint value into the reply header and making the reply body null as described above, for example).

(6) The server side proxy 230 transfers the reply message in which the reply data is replaced with the fingerprint to the client side proxy 240.

(7) The client side proxy 240 that received the reply message detects that the reply data is replaced with the fingerprint, takes out the corresponding data from the fingerprint cache 244 by using the fingerprint (specified by the reply header or the like as described above, for example), and enters this data into the reply body. Also, in the case of using a configuration in which an information to be used only between the server side proxy 230 and the client side proxy 240 such as the fingerprint value exists in the reply header or the like, this information is deleted.

(8) The client side proxy 240 returns the reply message to (the browser or the like operating on) the client 250.

Note that each one of the fingerprint caches of the server side proxy 230 and the client side proxy 240 has an upper limit for its capacity so that it is preferable to sequentially delete old data or data that are less likely to be used, for example, by carrying out the garbage collection according to a prescribed algorithm.

However, in this case, there can be data which is still existing in the fingerprint cache 234 of the server side proxy 230 but which is already deleted in the fingerprint cache 244 of the client side proxy 240, so that there can be cases where an attempt to take out the reply data from the fingerprint cache 244 by using the fingerprint is made at the client side proxy 240 at the above described (7) but the corresponding set of the fingerprint and the data no longer exists in the fingerprint cache 244. In such cases, it is possible to provide a mechanism in which the client side proxy 240 requests the server side proxy 230 to send the data corresponding to the specified fingerprint, and the requested server side proxy 230 takes out the data corresponding to the specified fingerprint from the fingerprint cache 234 and returns this data, for example.

On the contrary, when there exists data which is already deleted from the fingerprint cache 234 of the server side proxy 230 but which is still existing in the fingerprint cache 244 of the client side proxy 244, the fingerprint and the reply data that are registered at that timing can be overwritten at a time of registering the fingerprint and the reply data into the fingerprint cache 244 at the client side proxy 240 by the above described (7) in the operation of FIG. 29.

Figure 30:
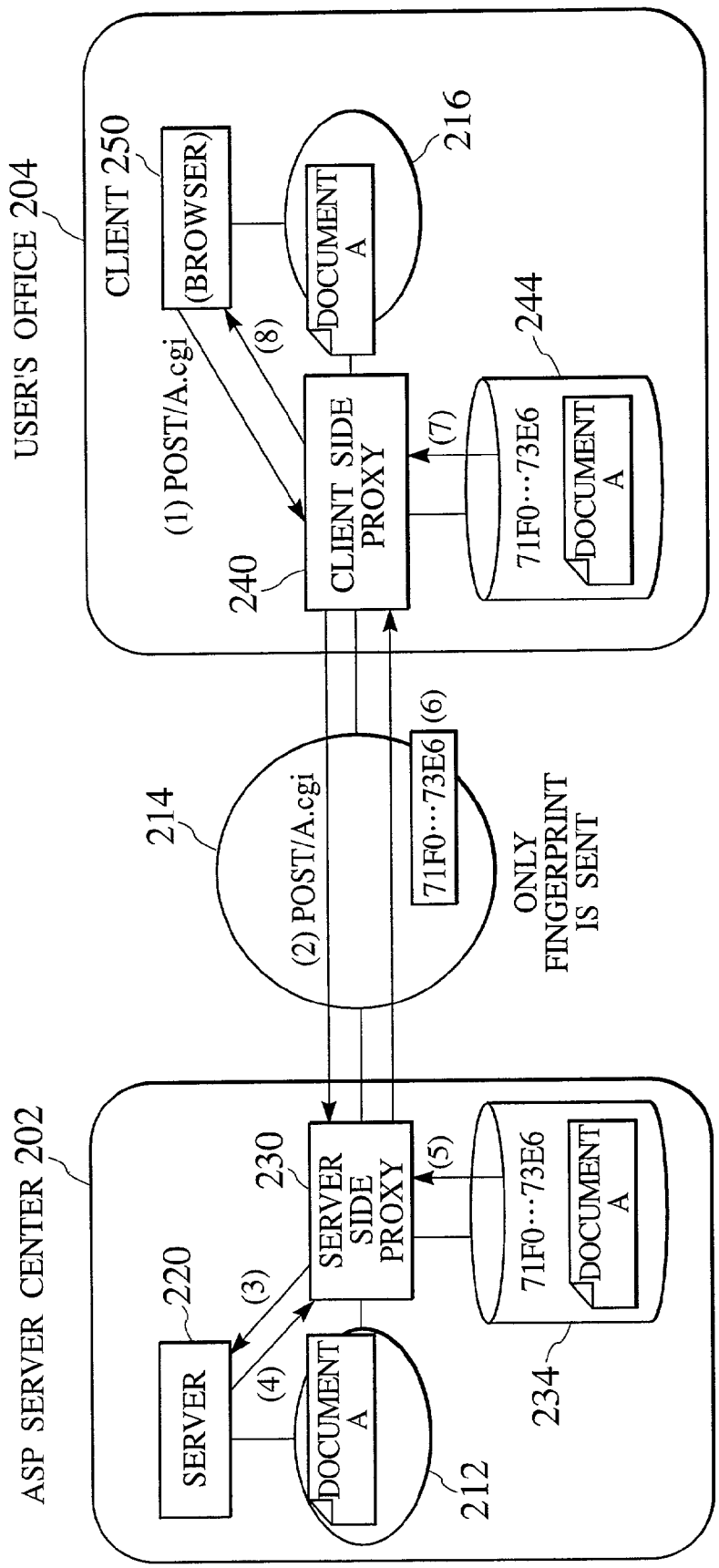
FIG. 30 is a diagram for explaining another exemplary data transfer between the server side proxy of FIG. 19 and the client side proxy of FIG. 20 according to one embodiment of the present invention.
Figure 31:
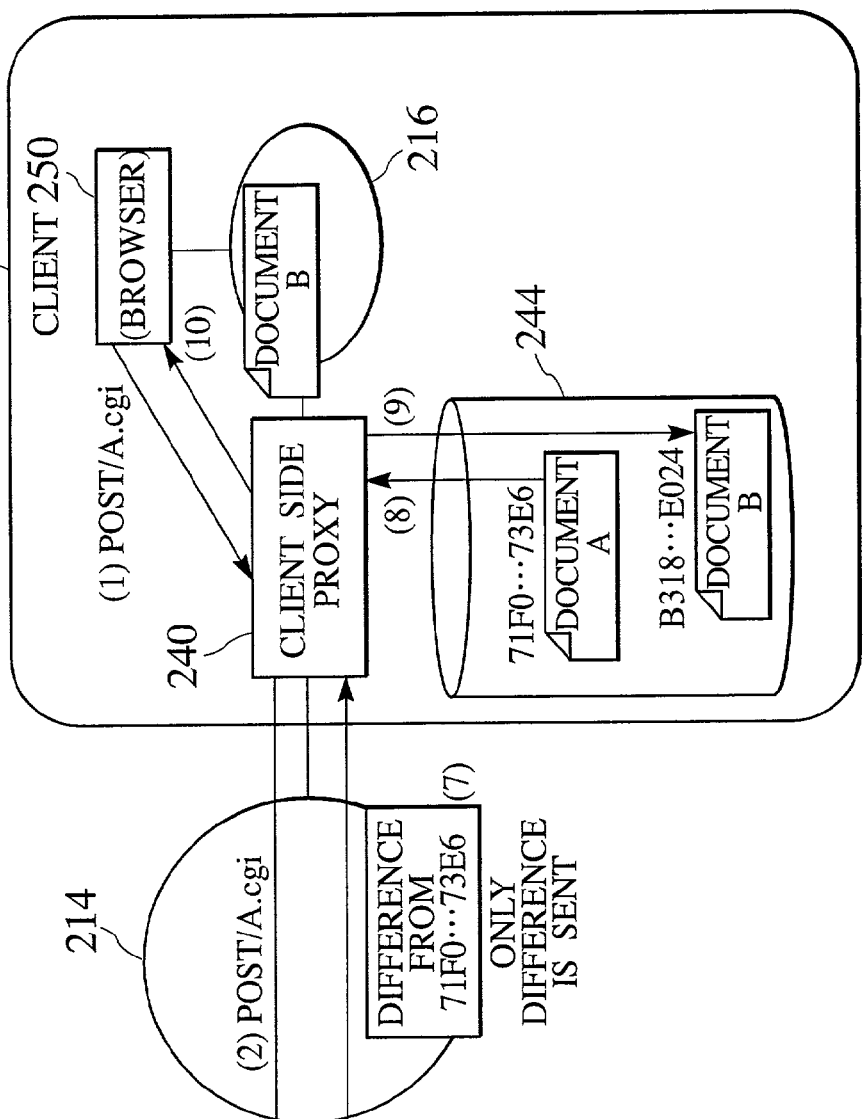
FIG. 31 is a diagram for explaining another exemplary data transfer between the server side proxy of FIG. 19 and the client side proxy of FIG. 20 according to one embodiment of the present invention.

In the above described (5) in the operation of FIG. 30, the processing assumes that when the fingerprint of the reply data is obtained and this fingerprint exists in the fingerprint cache 234 at the server side proxy 230, the same data as this reply data exists in correspondence with this fingerprint in the fingerprint cache 234. This method is sufficient if it is assumed that the same fingerprint will not be generated from different data in practice, but there is also a method for eliminating an error that can be caused when the same fingerprint is generated from different data which occurs at a very small probability.

In this case, when the fingerprint obtained from the reply data exists in the fingerprint cache 234, the data existing in the fingerprint cache 234 in correspondence with this fingerprint is compared with that reply data to judge whether they are the same or not. At this point, the processing in the case where it is judged that the fingerprint is the same but data with different contents are registered can be any of the following.

This fingerprint will not be used thereafter (in which case the data that gives this fingerprint will not be cached thereafter).

The fingerprint and the data that are registered earlier will be given the priority (in which case the other data that gives the same fingerprint as the registered fingerprint will not be cached while this fingerprint is registered).

The fingerprint and the data to be currently registered will be given the priority (in which case the registered data will be sequentially updated by the other data that-gives the same fingerprint).

Next, with reference to FIG. 31, the operation in the case of carrying out the difference transfer will be described.

(1) to (4) are the same as (1) to (4) in the operation of FIG. 29.

(5) The server side proxy 230 that received the reply message calculates the fingerprint of the reply data contained in the received reply message first, and checks whether the data having this fingerprint name exists in the fingerprint cache 234 or not. Here it does not exist, so that it is the first time data and this data is entered (registered) into the fingerprint cache 234 by using the fingerprint as its name.

(6) When the FP compression of the compression target data was unsuccessful, the differential compression processing is carried out and the differential compression is applied if the amount of data can be reduced by the differential compression of the reply data. Here, it is assumed that the amount of data can be reduced by the differential compression of the reply data when the data having the fingerprint of "71F0 . . . 73E6" is used as the reference data. The reply data is replaced with the difference compressed data and the information indicating the presence of the differential compression is entered into the reply header or the like.

(7) The server side proxy 230 transfers the reply message to the client side proxy 240.

(8) The client side proxy 240 looks at the reply header or the like to ascertain that the reply data is difference compressed and carries out the decompression. At this point, the fingerprint "71F0 . . . 73E6" of the reference data specified in the compressed data is taken out first, and the data corresponding to this fingerprint is taken out from the fingerprint cache 244 and used next. The decompressed data is entered into the reply data and the necessary information such as a content size of the reply header is rewritten.

(9) Also, the client side proxy 240 that received the reply message registers the decompressed reply data into the fingerprint cache 244 as it is the first time data. Also, in the case of using a configuration in which an information to be used only between the server side proxy 230 and the client side proxy 240 such as the fingerprint value exists in the reply header or the like, this information is deleted.

Note that, as described above, either the fingerprint is calculated from the reply data or the fingerprint entered in the reply header or the like by the server side proxy 230 is taken out, and this fingerprint is entered as a name.

(10) The client side proxy 240 returns the reply message to (the browser or the like operating on) the client 250.

Note that every unregistered compression target data is registered into the fingerprint cache in the above described (5), and the registration in the fingerprint cache is maintained for every data used as the reference data in the above described (6).

But it is also possible to use a method in which, when only one data is used as the reference data and the differential compression target data and the reference data used for the differential compression have almost the same contents (the amount of data that do not match between them is less than or equal to a prescribed criterion, for example), (i) the unregistered compression target data is not registered and the registration in the fingerprint cache is maintained for the reference data, or (ii) the unregistered compression target data is registered into the fingerprint cache and the reference data is deleted from the fingerprint cache. It is also possible to use a method in which, when only one data is used as the reference data, the differential compression target data and the reference data used for the differential compression have almost the same contents, and the URLs are the same, it is regarded that the data is updated so that the unregistered compression target data is registered into the fingerprint cache, and the reference data is deleted from the fingerprint cache. There are many other variations besides these.

Note that, in the examples described so far, it is assumed that the fingerprint cache is to be utilized at a time of transferring the reply data from the server side proxy 230 to the client side proxy 240, and the timing for registering a set of the data and its corresponding fingerprint into the fingerprint cache is assumed to be that at which this data is transferred from the server side proxy 230 to the client side proxy 240 for the first time. However, there are cases where the data is to be first created at the user's office or the like and registered into the server, and then this data is to be frequently accessed from the browser or the like, as in the case of the Web-based ASP, for example. In such cases, it is also possible to register the data into the fingerprint caches of the server side proxy 30 and the client side proxy 240 at a timing of registering this data at the server such that the subsequent accesses can be made faster.

For this reason, when the reply data to be transmitted by the server is the data originally transferred from the client to the server (originally transferred as the request data), the registration timing is set to be the timing at which the original request data that becomes the reply data is transferred from the client side proxy 240 to the server side proxy 230 for the first time. In this case, when that request data becomes the reply data and is to be transferred from the server side proxy 230 to the client side proxy 240 for the first time, the registration into the fingerprint cache has already been completed, so that the amount of transfer data can be reduced by utilizing the fingerprint cache even when it is transferred as the reply data for the first time.

Now, in the examples described so far, at a time of transferring the reply data from the server side proxy 230 to the client side proxy 240, if this reply data is the same as that registered in the fingerprint cache, the network traffic is reduced by transferring the corresponding fingerprint or by transferring the difference compressed data instead of this reply data. The present invention can be applied also to the case of transferring the request data from the client side proxy 240 to the server side proxy 30 as well.

Note that, in the case of applying the FP compression to both of them, it is also possible to apply the differential compression to only one of them.

Note that it is also possible to apply the FP compression and the differential compression only to the case of transferring the request data from the client side proxy 240 to the server side proxy 230.

In the case of applying the FP compression and the differential compression to the request data transfer from the client side proxy 240 to the server side proxy 30, the roles of the server side proxy 230 and the client side proxy 240 with respect to the reply data described above should be interchanged, so that in the case of applying the FP compression and the differential compression to both the request data transfer and the reply data transfer, the server side proxy 230 should have a fingerprint decompression processing unit and a differential decompression processing unit in the processing unit 232 in addition to the configuration of FIG. 19, and the client side proxy 240 should have a fingerprint compression processing unit and a differential compression processing unit in the processing unit 242 in addition to the configuration of FIG. 20.

Note that, in either proxy, the fingerprint compression processing unit and the fingerprint decompression processing unit can be combined into a fingerprint compression/decompression processing unit. Similarly, the differential compression processing unit and the differential decompression processing unit can be combined into a differential compression/decompression processing unit.

Also, in the server side proxy 230 and/or the client side proxy 240, it is possible to provide the fingerprint cache for the request data transfer independently from the fingerprint cache for the reply data transfer, and it is also possible to share the same fingerprint cache among the reply data transfer and the request data transfer. In the case of the configuration that uses the above described log table at a time of the differential compression, similarly it is possible to provide the log table independently for the reply data transfer and the request data transfer or it is also possible to share the same log table among the reply data transfer and the request data transfer.

Figure 32:
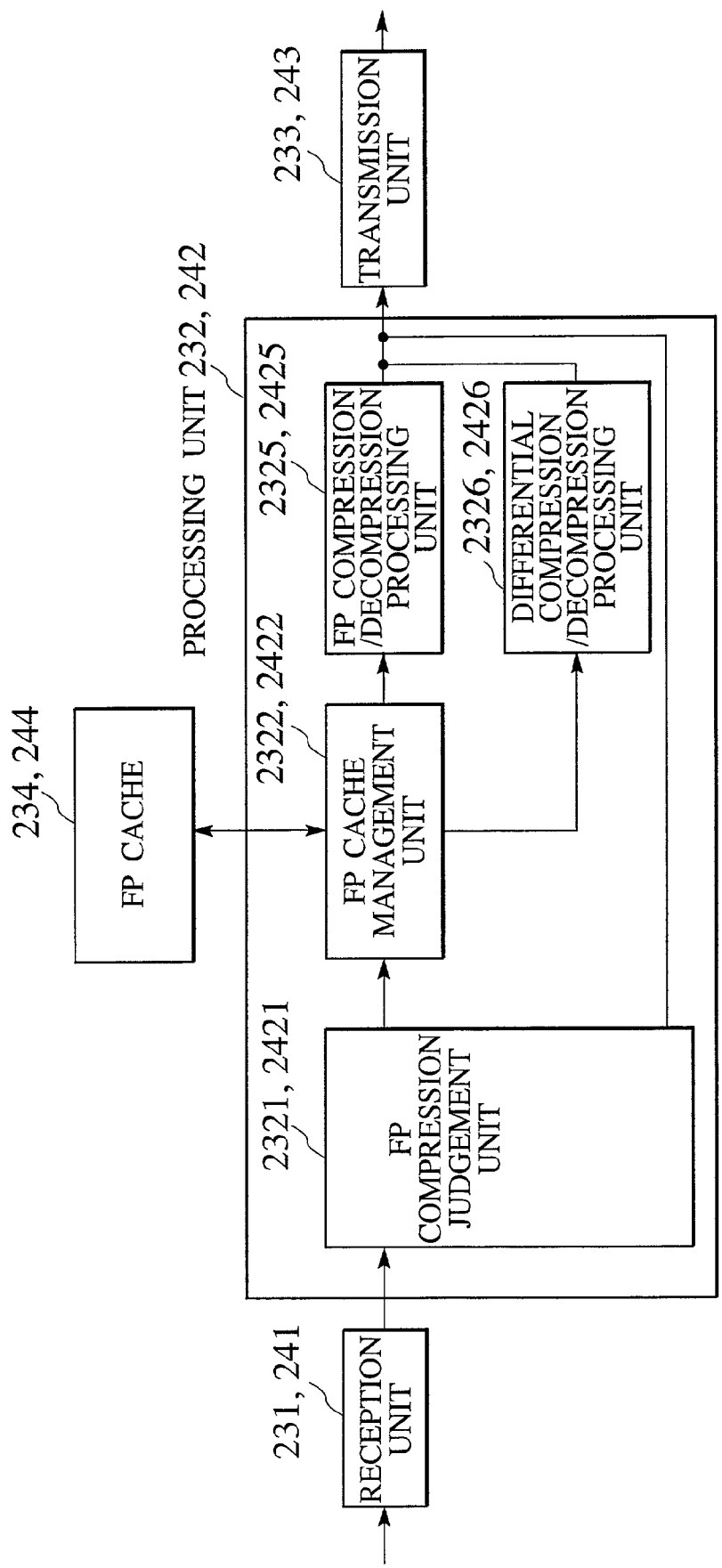
FIG. 32 is a block diagram showing another exemplary configuration of a server side or client side proxy according to one embodiment of the present invention.

FIG. 32 shows an exemplary configuration of the proxy (which can be either one of the server side proxy and the client side proxy) in this case.

Figure 33:
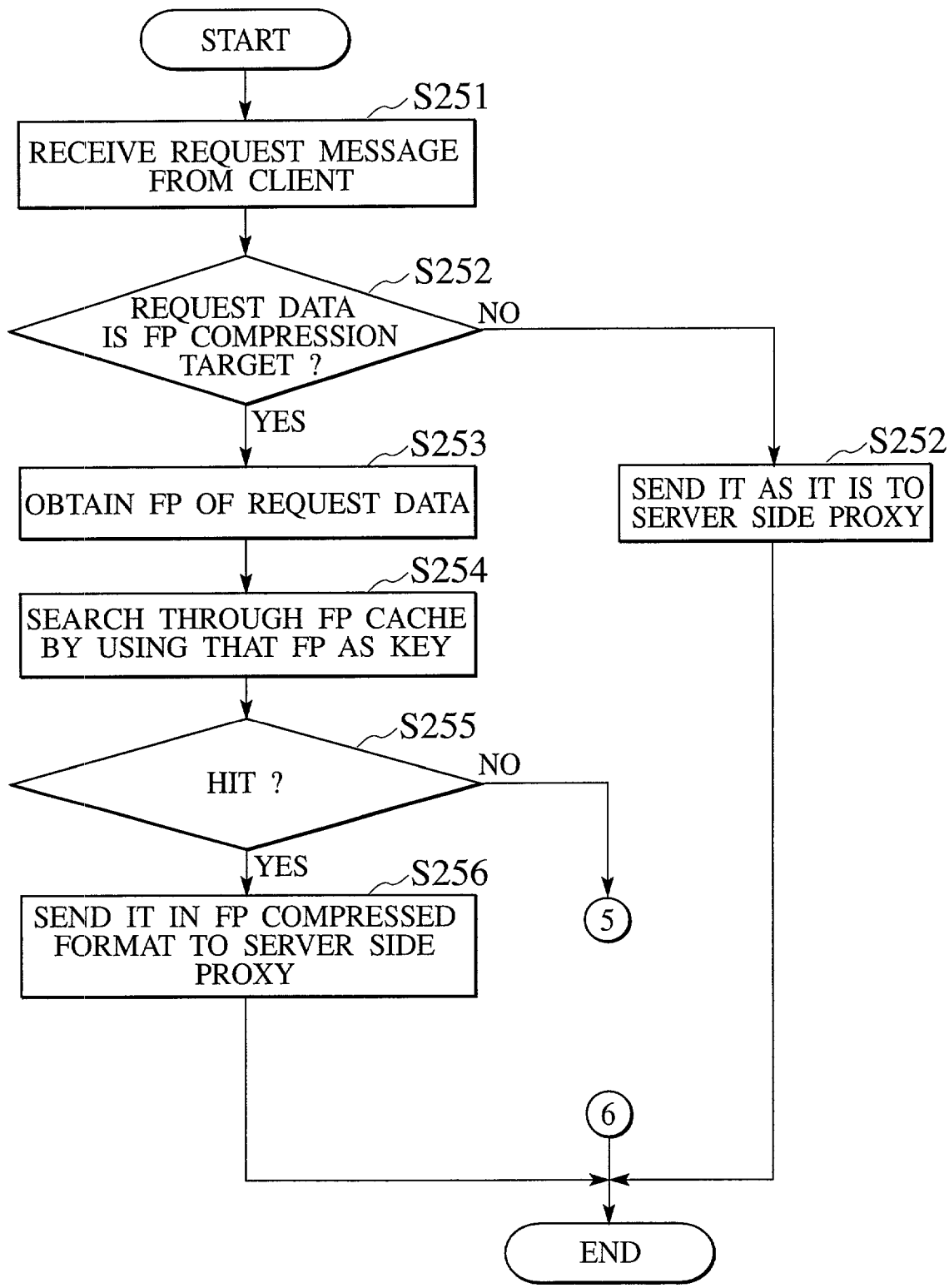
FIG. 33 is a flow chart showing one exemplary processing procedure of the client side proxy of FIG. 32 according to one embodiment of the present invention.
Figure 34:
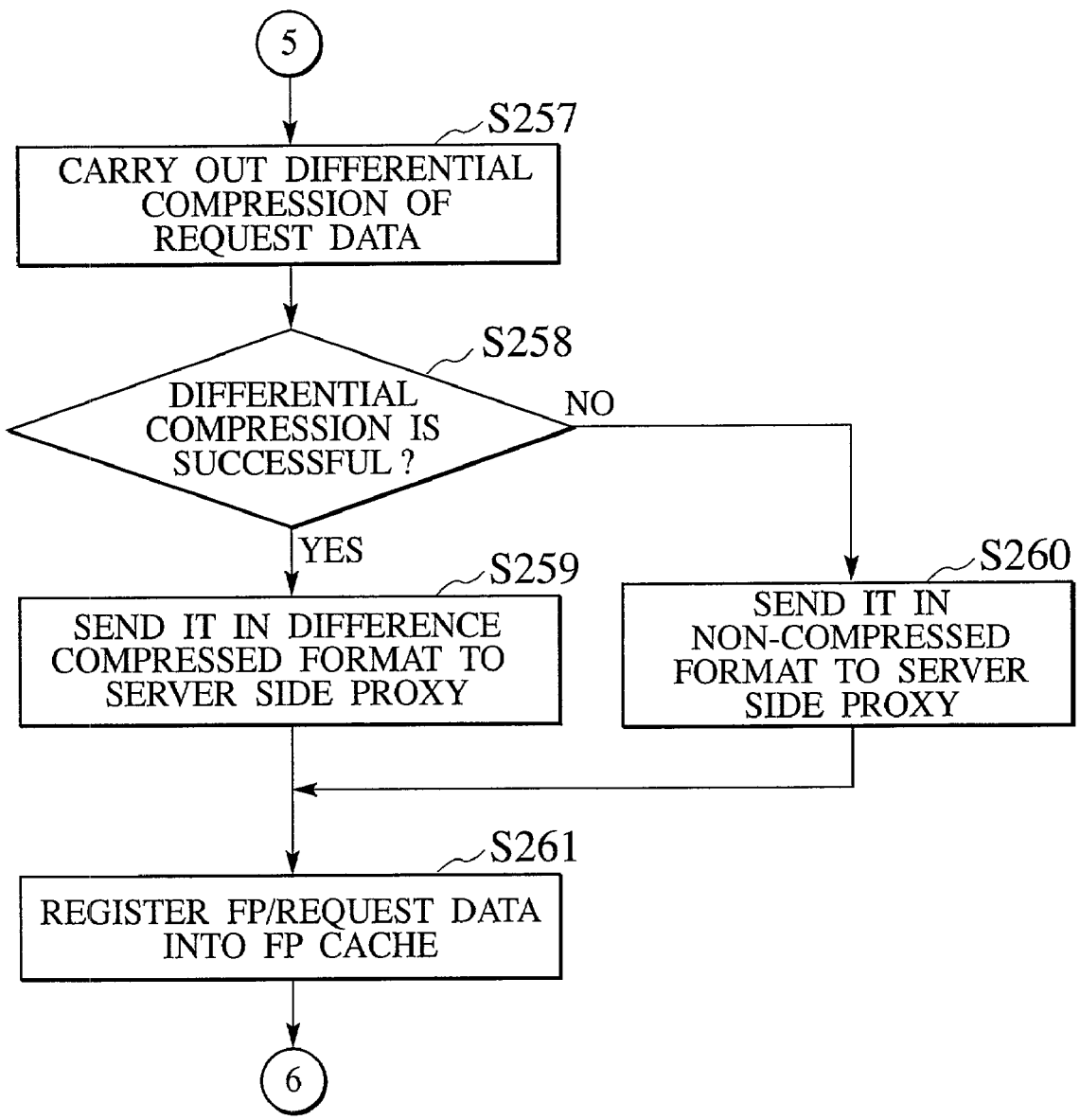
FIG. 34 is a flow chart showing another exemplary processing procedure of the client side proxy of FIG. 32 according to one embodiment of the present invention.

Also, FIG. 33 and FIG. 34 show an exemplary processing procedure of the client side proxy 240 at a time of transferring the request message from the client side proxy 240 to the server side proxy 230. FIG. 33 and FIG. 34 differs from FIG. 21 and FIG. 22 in that the message to be transferred is changed from the reply message to the request message, the message transmission source is changed from the server to the client, the message transmission destination is changed from the client to the server, and the operation of the server side proxy 230 and the operation of the client side proxy 240 is interchanged.

Figure 35:
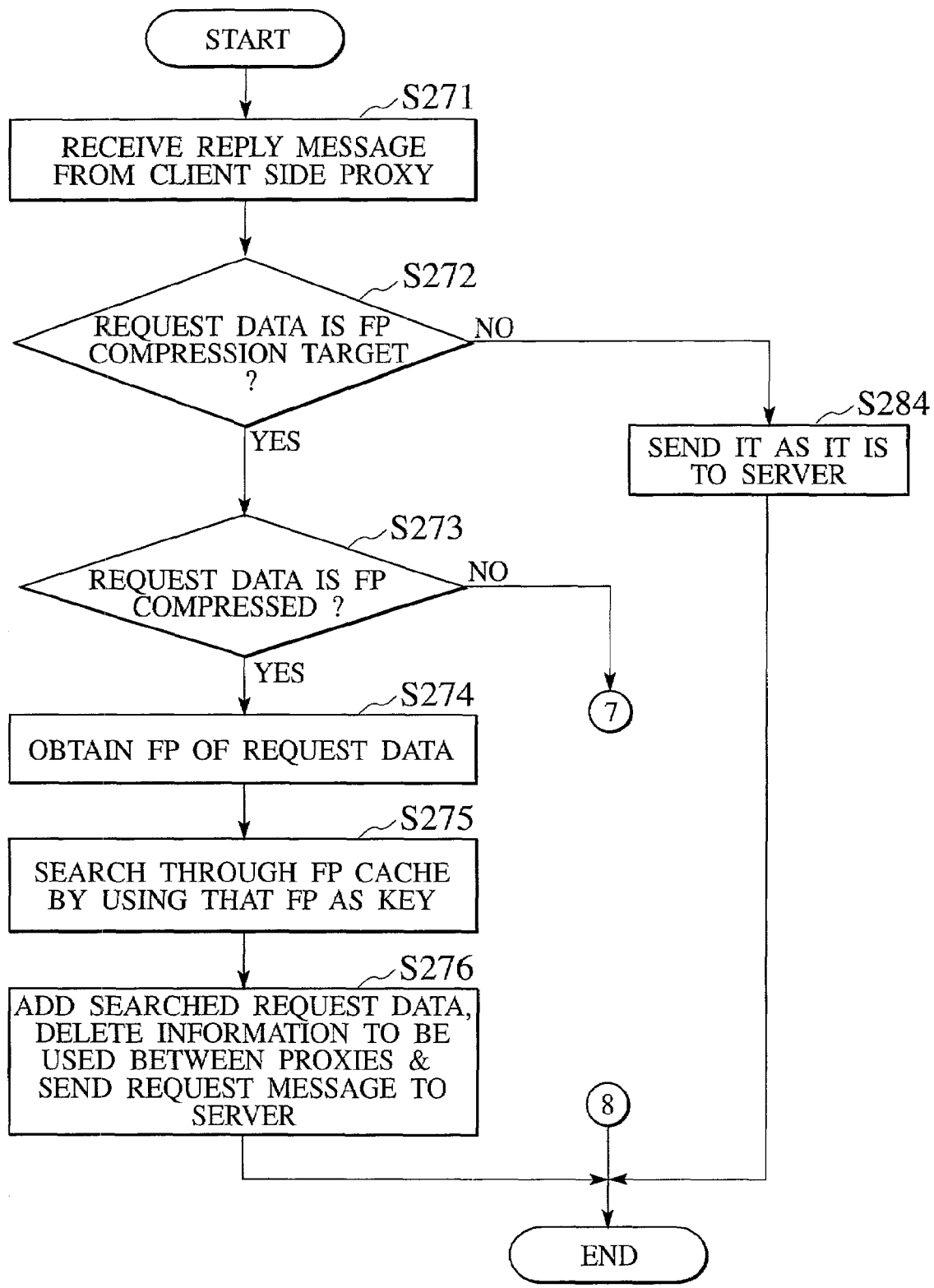
FIG. 35 is a flow chart showing one exemplary processing procedure of the server side proxy of FIG. 32 according to one embodiment of the present invention.
Figure 36:
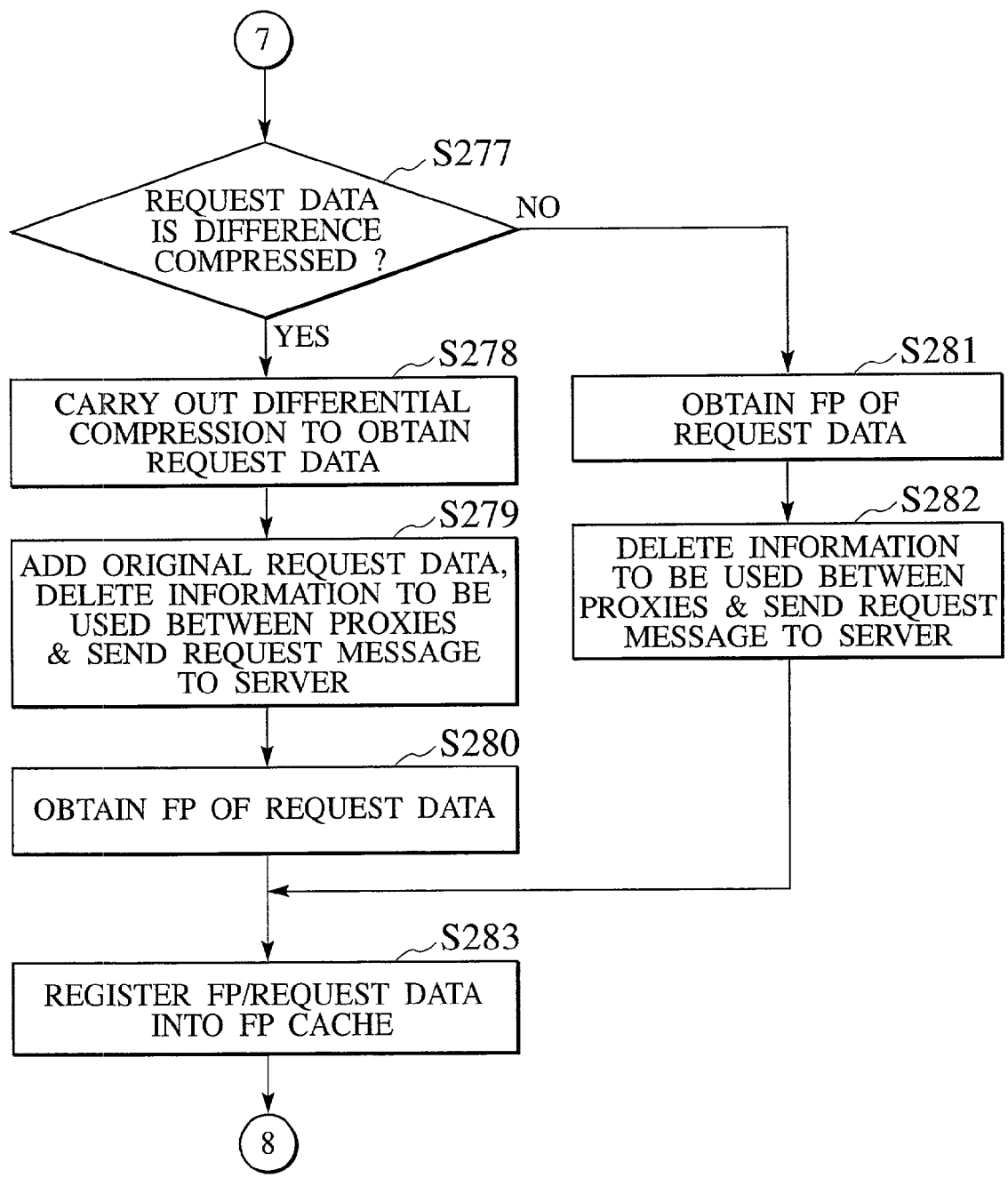
FIG. 36 is a flow chart showing another exemplary processing procedure of the server side proxy of FIG. 32 according to one embodiment of the present invention.

Next, FIG. 35 and FIG. 36 show an exemplary processing procedure of the server side proxy 230 at a time of transferring the request message from the client side proxy 240 to the server side proxy 230. FIG. 35 and FIG. 36 differs from FIG. 23 and FIG. 24 in that the message to be transferred is changed from the reply message to the request message, the message transmission source is changed from the server to the client, the message transmission destination is changed from the client to the server, and the operation of the server side proxy 230 and the operation of the client side proxy 240 is interchanged.

In the case where even the request data is to be replaced with the fingerprint or the difference compressed data in this way, at a time of uploading the same file to the server many times, for example, it suffices to send the fingerprint in the second and subsequent times so that the network traffic can be reduced.

Note that, in this embodiment, the cases of handling the request message to be transferred from the client side proxy to the server side proxy or the reply message to be transferred from the server side proxy to the client side proxy have been described, but in the case where one proxy is connected with both a device for transmitting the request message and a device for transmitting the reply message, or with a device for transmitting both the request message and the reply message, it is of course possible to handle the request message and the reply message to be transferred from the client side proxy to the server side proxy as well as the request message and the reply message to be transferred from the server side proxy to the client side proxy. It is also possible to handle only the request message to be transferred from the client side proxy to the server side proxy and the request message to be transferred from the server side proxy to the client side proxy, for example.

Figure 37:
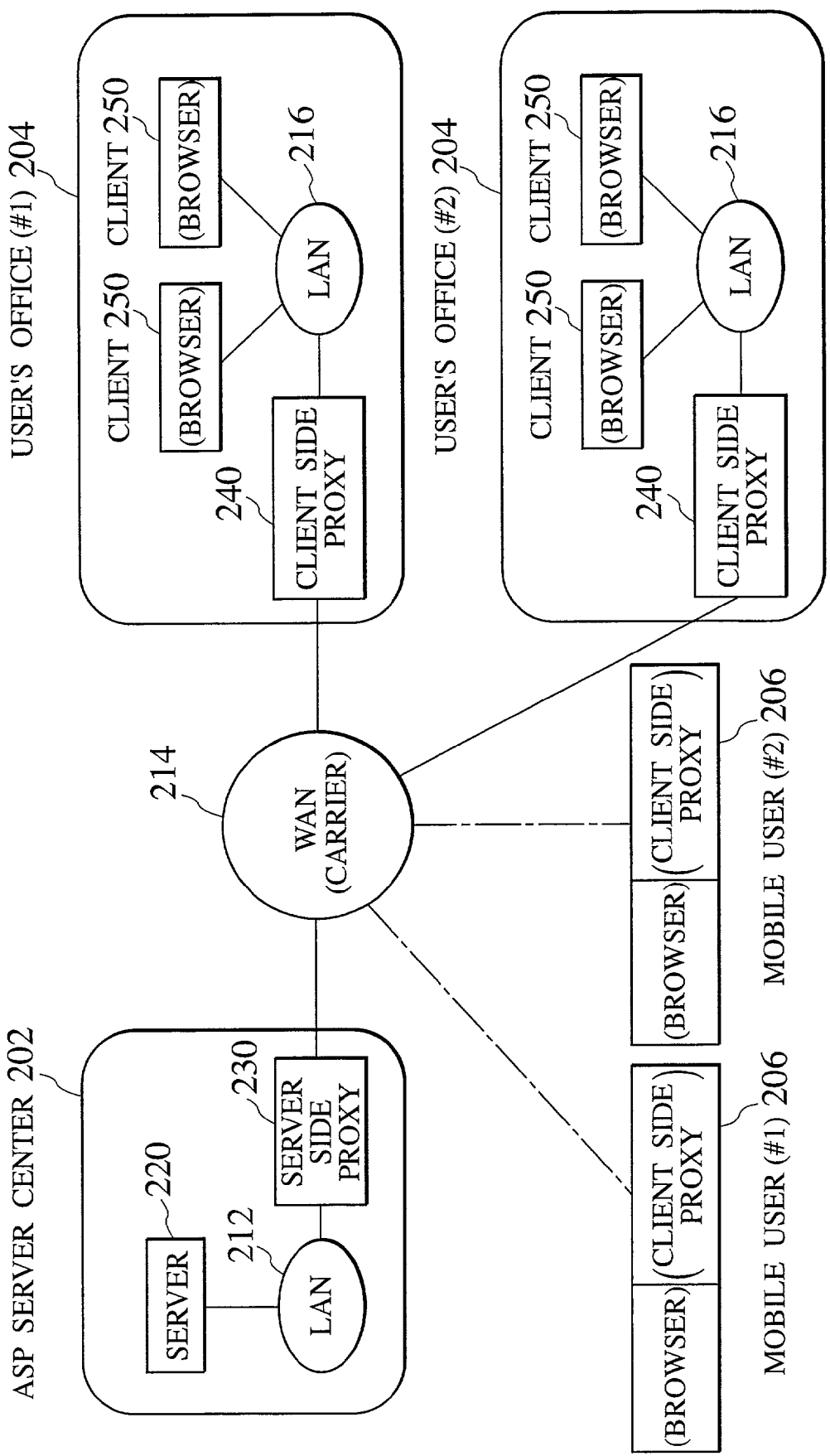
FIG. 37 is a diagram showing another exemplary configuration of a computer network system according to one embodiment of the present invention.

Now, up to this point, the embodiment using one-to-one communications between one server side proxy and one client side proxy has been described, but the present invention is not limited to a system using one-to-one communications between the server side proxy and the client side proxy and also applicable to a system using one-to-multiple communications between the server side proxy and the client side proxies, a system using multiple-to-one communications between the server side proxies and the client side proxy, and a system using multiple-to-multiple communications between the server side proxies and the client side proxies. For example, as shown in FIG. 37, the client side proxies provided at a plurality of user's offices and/or the personal proxies utilized by the mobile users can share the server side proxy.

Also, up to this point, the embodiment in which the entire data contained in one message is a target for applying the FP compression (a target for the registration into the fingerprint cache) has been described, but in the case where the data contained in one message is formed by a set of prescribed unit data, for example, it is also possible to set only a part of the unit data contained in one message as a target for applying the FP compression (a target for the registration into the fingerprint cache).

Note that, with respect to the reply data that is cachable by the shared cache mechanism of the proxy, it is also possible for (either one or both of) the server side proxy 230 and the client side proxy 240 of this embodiment to cache a correspondence among the URL specified in the request message issued by the client, the reply data contained in the reply message corresponding to that request message, the fingerprint corresponding to that reply data, an information necessary for forming the request header such as the MIME type contained in the reply header of that reply message, and an information such as timestamp to be used at a time of judging the valid period (it is possible to store all of these informations in the fingerprint cache or it is possible to separately provide a correspondence table for storing these informations except for the reply data (the URL, the fingerprint, and the other information)), and use this caching function in combination with the fingerprint cache to realize the operation of the shared cache for the proxy server as well.

For example, in the case where this caching function is provided at the client side proxy, when the reply data for the URL specified in the request message transmitted by the client is cached and this data is valid, it is possible for that client side proxy to acquire the data corresponding to the URL from the fingerprint cache, produce the reply message, and return the reply message to the client.

As described, according to the present invention, correspondences between data and their names are registered at the data transfer devices and the corresponding names are transferred, instead of transferring the data, for those data for which the correspondences are registered, so that it is possible to reduce the amount of transfer data among the data transfer devices.

For example, even when the reply message of the GET method is a private data, it is possible to compress this message by using the fingerprint and transfer it between the data transfer devices. Also, for example, even when the reply message of the GET method is a dynamic data, it is possible to compress this message by using the fingerprint and transfer it between the data transfer devices as long as the content of the data is the same. Also, for example, even in the case of using the POST method, it is possible to compress the data by using the fingerprint and transfer it between the data transfer device as long as the resulting data is the same.

Also, according to the present invention, even when the name corresponding to the data is not registered so that it is impossible to transfer the corresponding name instead of transferring the data, it is possible to reduce the amount of transfer data among the data transfer devices by transferring the compressed data in which this data is expressed in a compressed form by utilizing the name corresponding to the registered reference data.

For example, in the case where the reply data of the GET method or the POST method is partially different from the data accessed in the past, it is possible to reduce the amount of data by carrying out the difference transfer. Also, for example, in the case where the request data of the PUT method or the POST method is partially different from the data sent in the past, it is possible to reduce the amount of data by carrying out the difference transfer.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the server side proxy and the client side proxy of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that the fingerprint used in the above described embodiments can be replaced by the fingerprint calculated as described above plus some additional information.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A server side proxy device for receiving data transmitted from a server device and transmitting the data to a client side proxy device connected to a client device which is a destination of the data, the server side proxy device comprising:
    a reception unit configured to receive the data from the server device;
    a fingerprint generation unit configured to generate a fingerprint of the data received by the reception unit;
    a maintaining unit configured to set the data received by the reception unit as a reference data, and maintain the fingerprint generated by the fingerprint generation unit as a fingerprint cache according to the reference data by setting the fingerprint in relation to the reference data;
    a first judgement unit configured to judge whether the fingerprint generated by the fingerprint generation unit according to the data received by the reception unit is maintained in the fingerprint cache or not;
    a difference compression processing unit configured to generate a difference compressed expression data containing a compression information and a direct specification information indicating a remaining content obtained by removing a portion corresponding to the compression information from the data received by the reception unit, for each one or a plurality of portions of the data received by the reception unit, by obtaining the compression information formed by a set of the fingerprint that is set in relation to the reference data that contains an identical content as said each one or a plurality of portions among the reference data maintained in the fingerprint cache and a location information for enabling identification of a location at which the identical content exists in the reference data, when the first judgement unit judges that the fingerprint is not maintained in the fingerprint cache;
    a second judgement unit configured to judge whether a value indicating a level of compression is greater than or equal to a reference value or not, the level of compression being calculated an amount of data which is a source of the difference compressed expression data and an amount of data of the difference compressed expression data, with respect to an amount of data of the difference compressed expression data generated by the difference compression processing unit; and
    a transmission unit configured to transmit a fingerprint compressed data containing the fingerprint instead of data which is a source of the fingerprint, to the client side proxy device by setting the client device as the destination, when the first judgement unit judges that the fingerprint is maintained in the fingerprint cache when the data is received by the reception unit; or to set the fingerprint and data which is a source of the fingerprint in relation and add these fingerprint and data to the fingerprint cache and transmit a difference compressed data containing the difference compressed expression data instead of data which is a source of the difference compressed expression data, to the client side proxy device by setting the client device as the destination, when the first judgement unit judges that the fingerprint is not maintained in the fingerprint cache and the second judgement unit judges that the value indicating the level of compression is greater than or equal to the reference value for the difference compressed expression data generated by the difference compression processing unit; or to set the fingerprint and data which is a source of the fingerprint in relation and add these fingerprint and data to the fingerprint cache and transmit a non-compressed data containing received data, to the client side proxy device by setting the client device as the destination, when the second judgement unit judges that the value indicating the level of compression is not greater than or equal to the reference value for the difference compressed expression data generated by the difference compression processing unit.

2. A client side proxy device for receiving data transmitted from a server device via a server side proxy device and transmitting the data to a client device which is a destination of the data, the client side proxy device comprising:

a maintaining unit configured to set the data as a reference data and maintain a fingerprint of the reference data as a fingerprint cache by setting the fingerprint in relation to the reference data;

a reception unit configured to receive a fingerprint compressed data which contains the fingerprint of the data instead of the data, or a difference compressed data which contains a difference compressed expression data instead of the data, the difference compressed expression data containing a compression information and a direct specification information indicating a remaining content obtained by removing a portion corresponding to the compression information from the data for each one or a plurality of portions of the data, the compression information being formed by a set of the fingerprint that for the reference data that contains an identical content as said each one or a plurality of portions and a location information for enabling identification of a location at which the identical content exists in the reference data which are specified for said each one or a plurality of portions, or a non-compressed data which contains the data, from the server side proxy device;

a type judgement unit configured to judge whether the data received by the reception unit is the fingerprint compressed data, or the difference compressed data, or the non-compressed data;

a recovery processing unit configured to recover data which is a source of the difference compressed expression data by referring to a set of the fingerprint and the location information contained in the compression information corresponding to said each one or a plurality of portions in data which is a source of the difference compressed expression data contained by the difference compressed expression data that is contained in the difference compressed data, when the type judgement unit judges that the reception unit received the difference compressed data, by acquiring the identical content as in said each one or a plurality of portions according to an identifier and the location information from the fingerprint cache and using the identical content as said each one or a plurality of portions as acquired and the direct specification information contained in the difference compressed expression data; and a transmission unit configured to transmit data maintained in the fingerprint cache in relation to the fingerprint contained in the fingerprint compressed data, to the client device as the destination, when the type judgement unit judges that the reception unit received the fingerprint compressed data; or to add data recovered by the recovery processing unit according to the difference compressed expression data contained in the difference compressed data to the fingerprint cache in relation to the fingerprint generated according to the data and transmit the data to the client device as the destination, when the type judgement unit judges that the reception unit received the difference compressed data; or to add data contained in the non-compressed data to the fingerprint cache in relation to the fingerprint generated according to the data and transmit the data to the client device as the destination, when the type judgement unit judges that the reception unit received the non-compressed data.

* * * * *